(12) United States Patent
Chang et al.

(10) Patent No.: US 9,329,442 B2
(45) Date of Patent: May 3, 2016

(54) LIQUID CRYSTAL DISPLAY

(71) Applicant: Samsung Display Co., Ltd., Yongin-si (KR)

(72) Inventors: Hak Sun Chang, Yongin-si (KR); Jang Wi Ryu, Seoul (KR); Ki Chul Shin, Suwon-si (KR); Jae-Soo Jang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/931,312

(22) Filed: Nov. 3, 2015

(65) Prior Publication Data

US 2016/0054628 A1     Feb. 25, 2016

Related U.S. Application Data

(62) Division of application No. 13/835,941, filed on Mar. 15, 2013, now Pat. No. 9,213,209.

(30) Foreign Application Priority Data

Aug. 7, 2012  (KR) .......................... 10-2012-0086332

(51) Int. Cl.
*G02F 1/1343*    (2006.01)
*G02F 1/1335*    (2006.01)
*G02F 1/1337*    (2006.01)

(52) U.S. Cl.
CPC ........ *G02F 1/134309* (2013.01); *G02F 1/1337* (2013.01); *G02F 1/133553* (2013.01); *G02F 2001/134345* (2013.01)

(58) Field of Classification Search
CPC .............. G02F 1/33553; G02F 1/1337; G02F 2001/134345; G02F 1/134309
USPC .................................................. 349/142–144
See application file for complete search history.

(56) References Cited

U.S. PATENT DOCUMENTS

| | | | |
|---|---|---|---|
| 6,525,797 B2 | 2/2003 | Tsuda et al. | |
| 7,209,205 B2 | 4/2007 | Yoshida et al. | |
| 7,499,133 B2 | 3/2009 | Hsu et al. | |
| 7,760,305 B2 | 7/2010 | Takeda et al. | |

(Continued)

FOREIGN PATENT DOCUMENTS

| | | |
|---|---|---|
| JP | 2010-008693 | 1/2010 |
| KR | 10-0670061 | 1/2007 |

(Continued)

OTHER PUBLICATIONS

Notice of Allowance issued on Aug. 10, 2015, in U.S. Appl. No. 13/835,941.

*Primary Examiner* — Paul Lee
(74) *Attorney, Agent, or Firm* — H.C. Park & Associates, PLC

(57) ABSTRACT

A liquid crystal including: a first substrate; a pixel electrode disposed on the first substrate and including a first subpixel electrode and a second subpixel electrode disposed in one pixel area; a second substrate facing the first substrate; and a common electrode disposed on the second substrate, wherein an area of a region occupied by the first subpixel electrode is less than an area of a region occupied by the second subpixel electrode. Each of the first and second subpixels has a cross-shaped stem and minute branches extending from it to improve side visibility quality and gray scale uniformity.

8 Claims, 28 Drawing Sheets

(56) References Cited

U.S. PATENT DOCUMENTS

| | | |
|---|---|---|
| 7,782,432 B2 | 8/2010 | Wang et al. |
| 7,940,358 B2 | 5/2011 | Jin et al. |
| 7,999,879 B2 | 8/2011 | Yoshida et al. |
| 2008/0036931 A1* | 2/2008 | Chan ............. G02F 1/133707 349/38 |
| 2009/0073367 A1 | 3/2009 | Woo et al. |
| 2010/0079690 A1* | 4/2010 | Lee ............... G02F 1/133707 349/37 |
| 2010/0157186 A1* | 6/2010 | Kim ............... G02F 1/134336 349/39 |
| 2010/0182556 A1* | 7/2010 | Oh ................. G02F 1/133707 349/127 |
| 2011/0051059 A1 | 3/2011 | Kang et al. |
| 2011/0242443 A1 | 10/2011 | Choi et al. |
| 2011/0242468 A1 | 10/2011 | Choi et al. |

FOREIGN PATENT DOCUMENTS

| | | |
|---|---|---|
| KR | 10-0740570 | 7/2007 |
| KR | 10-0840680 | 6/2008 |
| KR | 10-0954337 | 4/2010 |

* cited by examiner

FIG.8
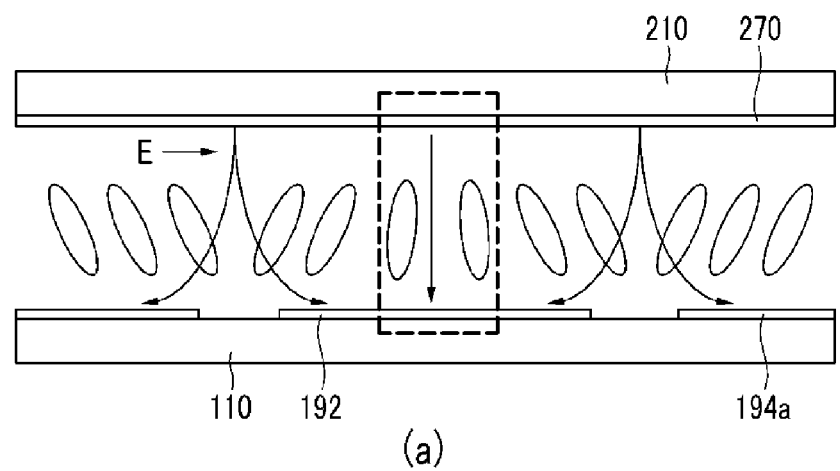
(a)
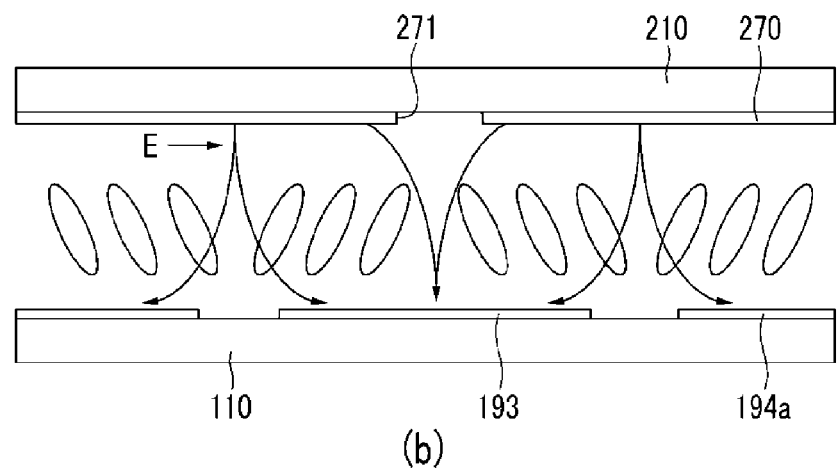
(b)

LIQUID CRYSTAL DISPLAY

CROSS-REFERENCE TO RELATED APPLICATION

This application is a Divisional of U.S. patent application Ser. No. 13/835,941, filed on Mar. 15, 2013, and claims priority from and the benefit of Korean Patent Application No. 10-2012-0086332, filed on Aug. 7, 2012, which are hereby incorporated by reference for all purposes as if fully set forth herein.

BACKGROUND

1. Field

Exemplary embodiments of the present invention relate to a liquid crystal display.

2. Discussion of the Background

A liquid crystal display is one of several types of flat panel displays that are now widely used. The liquid crystal display includes two display panels in which field generating electrodes, such as pixel electrodes and a common electrode, are formed, and a liquid crystal layer is interposed between the display panels. In the liquid crystal display, a voltage is applied to the field generating electrodes to generate an electric field in the liquid crystal layer, which determines the orientation direction of liquid crystal molecules of the liquid crystal layer, and an image is displayed by controlling the polarization of incident light.

Among the types of liquid crystal displays, a vertically aligned mode liquid crystal display has become popular. In this type of display the long axes of the liquid crystal molecules are arranged to be perpendicular to the display panel in the state in which an electric field is not applied, thereby resulting in a high contrast ratio and a wide reference viewing angle thereof. A reference viewing angle is defined as a viewing angle that results in a contrast ratio equal to 1:10 or as a limit angle for inversion in luminance between grays.

In order to increase side visibility quality to the level of front visibility quality in the vertical alignment mode LCD, a method of causing a difference in transmittance by dividing one pixel into two sub-pixels and applying different voltages to the two sub-pixels has been suggested.

However, when increasing the side visibility quality to the level of front visibility quality by dividing one pixel into two subpixels and forming different transmittances, the luminance is increased at a low gray scale or high gray scale such that gray scale expression is difficult from the side, thereby deteriorating display quality.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a liquid crystal display which produces an accurate gray scale in a low gray scale region while producing side visibility quality which is close to front visibility quality.

Additional features of the invention will be set forth in the description which follows, and in part will be apparent from the description, or may be learned by practice of the invention.

Exemplary embodiments of the present invention provide a liquid crystal display including a first substrate; a pixel electrode disposed on the first substrate and including a first subpixel electrode and a second subpixel electrode disposed in one pixel area; a second substrate facing the first substrate; and a common electrode disposed on the second substrate. An area of a region occupied by the first subpixel electrode is less than an area of a region occupied by the second subpixel electrode. The first subpixel electrode may include a first transverse stem, a first longitudinal stem, and a plurality of first minute branches extending from the first transverse stem and the first longitudinal stem. The second subpixel electrode may include a second transverse stem, a second longitudinal stem, and a plurality of second minute branches extending from the second transverse stem and the second longitudinal stem. A width of the first transverse stem of the first subpixel electrode is greater than the width of the first longitudinal stem of the first subpixel electrode, and the first transverse stem has a plurality of first cutouts parallel to the first minute branches and disposed at a predetermined interval.

The width of the second transverse stem of the second subpixel electrode may be substantially the same as the width of the second longitudinal stem of the second subpixel electrode.

A liquid crystal layer injected between the first substrate and the second substrate may be further included, and liquid crystal molecules of the liquid crystal layer may be arranged to be substantially perpendicular to a surface of the first substrate and the second substrate when an electric field is not generated between the pixel electrode and the common electrode.

An alignment layer disposed on at least one of the first substrate and the second substrate may be further included, and at least one of the liquid crystal layer and the alignment layer may include a light reactive material.

The width of the second transverse stem of the second subpixel electrode may be wider than of the width of the second longitudinal stem of the second subpixel electrode.

The width of the second transverse stem of the second subpixel electrode may be narrower than the width of the second longitudinal stem of the second subpixel electrode.

The common electrode may have a second cutout formed at a position corresponding to the first longitudinal stem.

The common electrode may have a third cutout formed at a position corresponding to the second longitudinal stem.

Exemplary embodiments of the present invention also provide a liquid crystal display including a first substrate; a pixel electrode disposed on the first substrate and including a first subpixel electrode and a second subpixel electrode disposed in one pixel area; a second substrate facing the first substrate; and a common electrode disposed on the second substrate. An area of a region occupied by the first subpixel electrode is less than an area of a region occupied by the second subpixel electrode. The first subpixel electrode may include a first transverse stem, a first longitudinal stem, and a plurality of first minute branches extending from the first transverse stem and the first longitudinal stem. The second subpixel electrode may include a second transverse stem, a second longitudinal stem, and a plurality of second minute branches extending from the second transverse stem and the second longitudinal stem. The common electrode has a first cutout formed at a position corresponding to the first longitudinal branch of the first subpixel electrode.

The width of the first transverse stem of the first subpixel electrode may be substantially the same as the width of the first longitudinal stem of the first subpixel electrode.

The common electrode may further have a second cutout formed at a position corresponding to the second longitudinal stem or the second transverse stem of the second subpixel electrode.

In the liquid crystal display according to an exemplary embodiment of the present invention, the pixel electrode disposed in one pixel area is divided into the first subpixel electrode and the second subpixel electrode, the first subpixel electrode and the second subpixel electrode have the cross-shaped stem and a plurality of minute branches extending therefrom, and the width of the transverse stem of the first subpixel electrode is wider than the width of the longitudinal stem of the first subpixel electrode such that the luminance of the liquid crystal display is reduced in the low gray region and the high gray region, and as a result, the correct gray expression is possible in the low gray region and the high gray region and the lateral visibility may be close to the front visibility.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 is a schematic view illustrating an operation of liquid crystal molecules of the liquid crystal display shown in FIG. 6 and FIG. 7.

DETAILED DESCRIPTION OF THE ILLUSTRATED EMBODIMENTS

Figure 1:
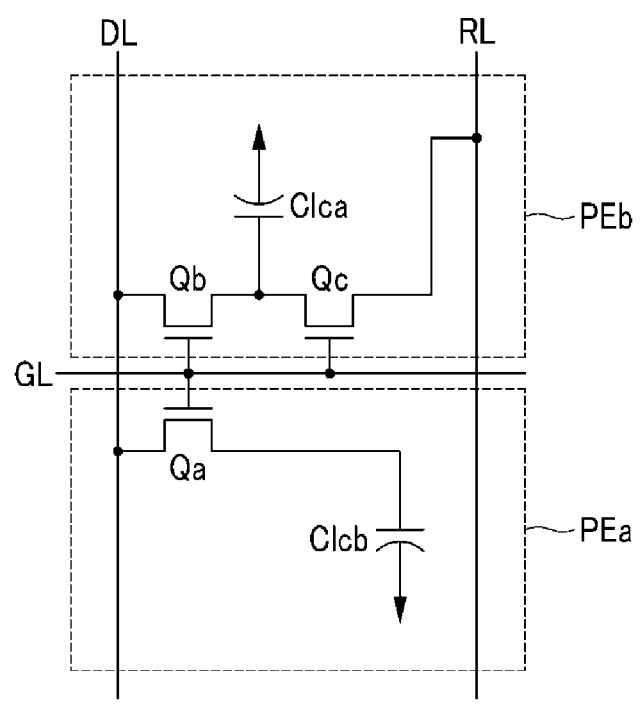
FIG. 1 is an equivalent circuit diagram of one pixel of a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., are exaggerated for clarity. Like reference numerals in the drawings denote like elements. It will be understood that when an element, such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal display according to an exemplary embodiment of the present invention will be described with reference to FIG. 1, which is an equivalent circuit diagram of one pixel of a liquid crystal display.

Referring to FIG. 1, one pixel PX of the liquid crystal display according to the exemplary embodiment of the present invention includes a plurality of signal lines including a gate line GL transmitting a gate signal, a data line DL transmitting a data signal, and a reference voltage line RL transmitting a divided reference voltage. A first switching element Qa, a second switching element Qb, a third switching element Qc, a first liquid crystal capacitor Clca, and a second liquid crystal capacitor Clcb are connected to the plurality of signal lines.

The first switching element Qa and the second switching element Qb are respectively connected to the gate line GL and the data line DL, and the third switching element Qc is connected to the output terminal of the second switching element Qb and the reference voltage line RL.

The first switching element Qa and the second switching element Qb are three-terminal thin film transistors, and control terminals thereof are connected to the gate line GL, input terminals are connected to the data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also a three-terminal thin film transistor, and a control terminal thereof is connected to the gate line GL, an input terminal is connected to the second liquid crystal capacitor Clcb, and an output terminal is connected to the reference voltage line RL.

When a gate-on signal is applied to the gate line GL, the first switching element Qa, the second switching element Qb, and the third switching element Qc that are connected thereto are turned on. Accordingly, the data voltage applied to the data line DL is respectively applied to a first electrode PEa and a second electrode PEb through the first switching element Qa and the second switching element Qb that are turned on. In this case, the data voltages applied to the first electrode PEa and the second electrode PEb may be charged at the same value. However, according to the exemplary embodiment of the present invention, the voltage applied to the second electrode PEb is divided through the third switching element Qc connected with the second switching element Qb in series. Accordingly, the voltage Vb applied to the second electrode PEb is smaller than the voltage Va applied to the first electrode PEa.

As a result, the voltage charged to the first liquid crystal capacitor Clca and the voltage charged to the second liquid crystal capacitor Clcb are different from each other such that the inclined angle of the liquid crystal molecules in the first subpixel is different from the inclined angle of the liquid crystal molecules in the second subpixel, thereby changing the luminance of the two subpixels. Therefore, when the charging voltages of the first and second liquid crystal capacitors Clca and Clcb are appropriately adjusted, it is possible to make an image viewed from the side be as similar as possible to an image viewed from the front, and as a result it is possible to improve the side visibility quality.

As described, when the voltage charged to the first liquid crystal capacitor Clca and the voltage charged to the second liquid crystal capacitor Clcb are different, in a low gray scale region where a magnitude of the data voltage is relatively low, the first liquid crystal capacitor Clca connected to the first subpixel electrode Pea, to which the relatively large voltage is applied, is charged with the charge. However, the second liquid crystal capacitor Clcb connected to the second subpixel electrode PEb applied with a voltage lower than the applied data voltage may not be charged with the charge. Therefore, in the low gray scale region where the applied data voltage is low, the brightness of the pixel PX is determined by the first subpixel electrode PEa.

Figure 2:
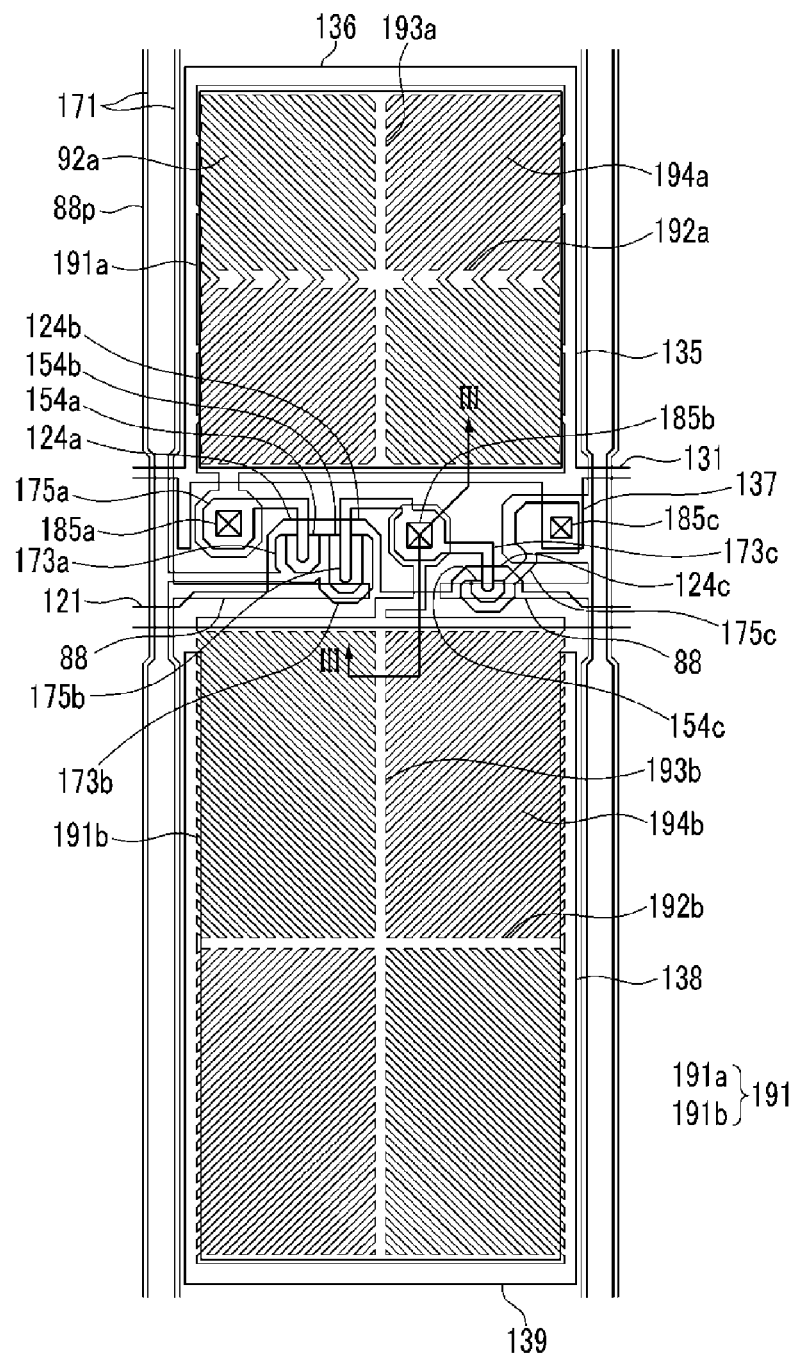
FIG. 2 is a layout view of the liquid crystal display according to an exemplary embodiment of the present invention.

Next, a structure of the liquid crystal display according to the exemplary embodiment shown in FIG. 1 will be described with reference to FIG. 2 and FIG. 3. FIG. 2 is a layout view of the liquid crystal display according to the exemplary embodiment of the present invention, and FIG. 3 is a cross-sectional view of the liquid crystal display of FIG. 2 taken along line III-III.

Figure 3:
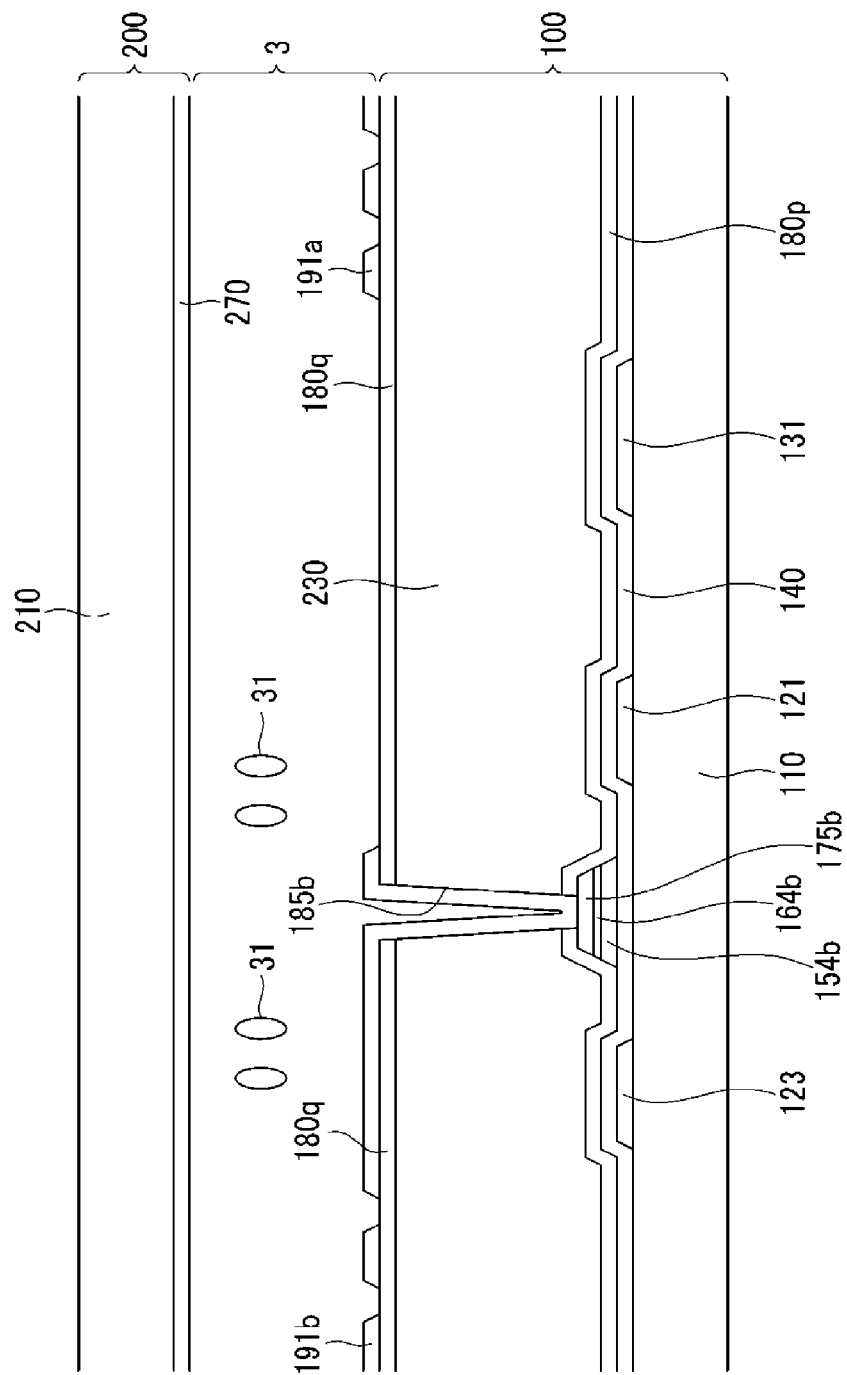
FIG. 3 is a cross-sectional view of the liquid crystal display of FIG. 2 taken along line III-III.

Referring to FIG. 2 and FIG. 3, the liquid crystal display according to the present exemplary embodiment includes a lower panel 100 and an upper panel 200 facing each other, and a liquid crystal layer 3 interposed between the two display panels 100 and 200.

First, the lower panel 100 will be described.

A gate line 121, a reference voltage line 131, and storage electrodes 135, 136, 138, and 139 are formed on an insulation substrate 110 made of transparent glass or plastic. The gate line 121 transfers a gate signal and mainly extends in a longitudinal direction.

The gate line 121 includes a first gate electrode 124a, a second gate electrode 124b, a third gate electrode 124c, and a wide end (not shown) for connection with other layers and an external driving circuit.

The reference voltage line 131 may extend parallel to the gate line 121 and has an expansion 137, and the expansion 137 is connected to a third drain electrode 175c that will be described later.

The reference voltage line 131 may include first storage electrodes 135 and 136 enclosing the first subpixel electrode 191a.

A second subpixel electrode 191b may be enclosed by the second storage electrodes 138 and 139.

A gate insulating layer 140 is formed on the gate line 121, the reference voltage line 131, and the storage electrodes 135, 136, 138, and 139.

A first semiconductor 154a, a second semiconductor 154b, and a third semiconductor 154c that may be made of amorphous silicon or crystalline silicon are positioned on the gate insulating layer 140.

A plurality of ohmic contacts 164b are formed on the first semiconductor 154a, the second semiconductor 154b, and the third semiconductor 154c. When the semiconductors 154a, 154b, and 154c are formed with an oxide semiconductor, the ohmic contact may be omitted.

Data conductors 171, 173a, 173b 173c, 175a, 175b, and 175c, which include a data line 171 having a first source electrode 173a and a second source electrode 173b, a first drain electrode 175a, a second drain electrode 175b, a third source electrode 173c, and a third drain electrode 175c are formed on the ohmic contact and the gate insulating layer 140.

The second drain electrode 175b is connected to the third source electrode 173c.

The first gate electrode 124a, the first source electrode 173a, and the first drain electrode 175a form a first thin film transistor Qa along with the first semiconductor 154a, and a channel of the first thin film transistor Qa is formed in the first semiconductor 154a between the first source electrode 173a and the first drain electrode 175a. Similarly, the second gate electrode 124b, the second source electrode 173b, and the second drain electrode 175b form a second thin film transistor Qb along with the second semiconductor 154b, and a channel of the second thin film transistor Qb is formed in the second semiconductor 154b between the second source electrode 173b and the second drain electrode 175b. Similarly, the third gate electrode 124c, the third source electrode 173c, and the third drain electrode 175c form a third thin film transistor Qc along with the third semiconductor 154c, and a channel of the third thin film transistor Qc is formed in the third semiconductor 154c between the third source electrode 173c and the third drain electrode 175c.

A lower passivation layer 180p that may be made of an inorganic insulator such as silicon nitride or silicon oxide is formed on the data conductors 171, 173a, 173b 173c, 175a, 175b, and 175c and the exposed semiconductor portions 154a, 154b, and 154c.

A color filter 230 is positioned on the lower passivation layer 180p. The color filter 230 is positioned over most of the region except for the position where the first thin film transistor Qa, the second thin film transistor Qb, and the third thin film transistor Qc are disposed.

A light blocking member (not shown) may be positioned on a region where the color filter 230 is not positioned and on a portion of the color filter 230. The light blocking member is referred to as a black matrix and prevents light leakage.

An upper passivation layer 180q is formed on the color filter 230 and the light blocking member. The upper passivation layer 180q prevents peeling of the color filter 230 and the light blocking member, and suppresses contamination of the liquid crystal layer 3 by an organic material of the solvent that inflows from the color filter 230, so that it prevents defects, such as afterimages, which may occur when an image is driven.

The lower passivation layer 180p, the light blocking member, and the upper passivation layer 180q have a first contact hole 185a and a second contact hole 185b exposing the first drain electrode 175a and the second drain electrode 175b, and the lower passivation layer 180p, the light blocking member, the upper passivation layer 180q, and the gate insulating layer 140 have a third contact hole 185c exposing the expansion 137 of the reference voltage line 131 and the third drain electrode 175c.

A pixel electrode 191 including a first subpixel electrode 191a and a second subpixel electrode 191b, and a shielding electrode line 88p, are formed on the upper passivation layer 180q. The pixel electrode 191 may be formed of a transparent conductive material such as ITO or IZO, or a reflective metal such as aluminum, silver, chromium, or alloys thereof.

Each pixel electrode 191 includes the first subpixel electrode 191a and the second subpixel electrode 191b, which are separated from each other with the gate line 121 and the reference voltage line 131 interposed therebetween, and disposed above and below the pixel area so as to be adjacent to each other in a column direction. That is, one pixel area includes a first subpixel area where the first subpixel electrode 191a is disposed and a second subpixel area where the second subpixel electrode 191b is disposed, and the area of the second subpixel area where the second subpixel electrode 191b is disposed is greater than the area of the first subpixel area where the first subpixel electrode 191a is disposed.

Figure 4:
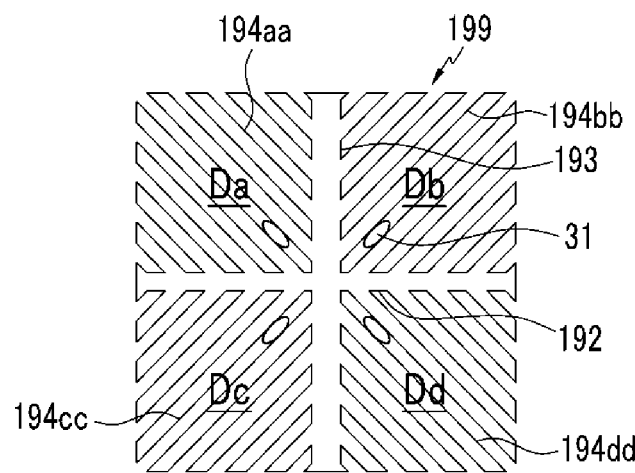
FIG. 4 is a top plan view illustrating a basic region of a field generating electrode of the liquid crystal display according to an exemplary embodiment of the present invention.

The first sub-pixel electrode 191a and the second sub-pixel electrode 191b include one or more basic electrodes 199, or modifications thereof, as shown in FIG. 4. The first subpixel electrode 191a may include a cross-shaped stem including a first transverse stem 192a and a first longitudinal stem 193a and a plurality of first minute branches 194a extending therefrom, and the second subpixel electrode 191b may include a cross-shaped stem including a second transverse stem 192b and a second longitudinal stem 193b and a plurality of second minute branches 194b extending therefrom.

Data voltages are respectively applied to the first subpixel electrode 191a and the second subpixel electrode 191b from the first drain electrode 175a and the second drain electrode 175b through the first contact hole 185a and the second contact hole 185b. The data voltage voltages applied to the first subpixel electrode 191a and the second subpixel electrode 191b form an electric field along with a common electrode 270 of the upper panel 200 such that the electric field determines the direction of liquid crystal molecules in the liquid crystal layer 3 between two electrodes 191 and 270. Accordingly, the luminance of the light transmitted through the liquid crystal layer 3 differs depending on the thusly determined orientation of the liquid crystal molecules.

The shielding electrode line 88p includes a shielding electrode 88 extending according to the data line 171 and protruding toward the gate line 121. A portion of the shielding electrode line 88p covers the third contact hole 185c exposing the expansion 137 of the reference voltage line 131 and the third drain electrode 175c, and thereby the expansion 137 of the reference voltage line 131 is electrically connected to the third drain electrode 175c.

Next, the upper panel 200 will be described.

A common electrode 270 is formed on an insulating substrate 210 made of a material such as transparent glass or plastic.

However, the liquid crystal display according to another exemplary embodiment of the present invention may include a light blocking member and a color filter (both not shown) formed on the insulation substrate 210.

Alignment layers (not shown) may be formed on inner surfaces of the display panels 100 and 200, and they may be vertical alignment layers.

A polarizer (not shown) may be provided on the outer surface of the two display panels 100 and 200, and the transmissive axes of the two polarizers may be orthogonal to each other and any one transmissive axis of is the two polarizers may be parallel to the gate line 121. However, the polarizer may only be disposed at one outer surface of the two display panels 100 and 200.

The liquid crystal layer 3 has negative dielectric anisotropy, and the liquid crystal molecules of the liquid crystal layer 3 may be aligned so that long axes thereof are vertical with respect to the surface of the two display panels 100 and 200 in a state in which there is no electric field. Therefore, the incident light may not pass through the crossed polarizers and is therefore blocked in a state in which there is no electric field.

At least one of the liquid crystal layer 3 and the alignment layer may include a photoreactive material, which may be a reactive mesogen.

As described above, because the first sub-pixel electrode 191a and the second sub-pixel electrode 191b to which the data voltage is applied generate an electric field in conjunction with the common electrode 270 of the upper panel 200, the liquid crystal molecules of the liquid crystal layer 3, which are aligned vertically with respect to the surfaces of the two electrodes 191 and 270 in a state in which there is no electric field, lie in a horizontal direction with respect to the surfaces of the two electrodes 191 and 270, and the luminance of light that passes through the liquid crystal layer 3 is changed according to the degree of tilt of the liquid crystal molecules.

Hereinafter, referring to FIG. 4, the basic electrode 199 will be described in detail. FIG. 4 is a top plan view illustrating a basic region of a field generating electrode of the liquid crystal display according to the exemplary embodiment of the present invention.

As shown in FIG. 4, the entire shape of the basic electrode 199 is quadrangular, and the basic electrode 199 may include a cross-shaped stem that is formed of a transverse stem portion 192 and a longitudinal stem portion 193 that is perpendicular thereto. In addition, the basic electrode 199 is divided into a first subregion Da, a second subregion Db, a third subregion Dc, and a fourth subregion Dd by the transverse stem portion 192 and the longitudinal stem portion 193, and each subregion Da-Dd includes a plurality of third minute branches 194*aa*, a plurality of fourth minute branches 194*bb*, a plurality of fifth minute branches 194*cc*, and a plurality of sixth minute branches 194*dd*, respectively.

The third minute branches 194*aa* obliquely extend from the transverse stem 192 or the longitudinal stem 193 in the upper-left direction, and the fourth minute branches 194*bb* obliquely extend from the transverse stem 192 or the longitudinal stem 193 in the upper-right direction. The fifth minute branches 194*cc* obliquely extend from the transverse stem 192 or the longitudinal stem 193 in the lower-left direction, and the sixth minute branches 194*dd* obliquely extend from the transverse stem 192 or the longitudinal stem 193 in the lower-right direction.

The third to sixth minute branches 194*aa*, 194*bb*, 194*cc*, and 194*dd* form an angle of about 45 degrees or 135 degrees with the gate line 121 or the transverse stem 192. The third to sixth minute branches 194*aa*, 194*bb*, 194*cc*, and 194*dd* of two neighboring subregions Da-Dd may be crossed.

According to another embodiment of the present invention, the widths of the third to sixth minute branches 194*aa*, 194*bb*, 194*cc*, and 194*dd* may increase or decrease closer to the transverse stem 192 or the longitudinal stem 192.

If the voltage is applied to the first subpixel electrode 191*a* and the second subpixel electrode 191*b*, the edges of the minute branches 194*aa*, 194*bb*, 194*cc*, and 194*dd* induce a fringe field which distorts the electric field, thereby forming a horizontal component that determines an inclination direction of the liquid crystal molecules. The horizontal components of the electric field are substantially horizontal to the sides of the third to sixth minute branches 194*aa*, 194*bb*, 194*cc*, and 194*dd*. Therefore, as shown in FIG. 4, the liquid crystal molecules 31 are inclined in a direction that is parallel to a length direction of the third to sixth minute branches 194*aa*, 194*bb*, 194*cc*, and 194*dd*. The liquid crystal molecules 31 disposed at the position corresponding to the transverse stem 192 and the longitudinal stem 193 of the cross-shaped stem are inclined in the direction parallel to the direction that the transverse stem 192 and the longitudinal stem 193 extend.

Because one pixel electrode 191 includes four subregions Da to Dd in which length directions of the third to sixth minute branches 194*aa*, 194*bb*, 194*cc*, and 194*dd* are different from each other, there are about four directions in which the liquid crystal molecules 31 may be inclined, and four domains in which the alignment directions of the liquid crystal molecules 31 are different from each other are formed in the liquid crystal layer 3. As described above, by diversifying the inclination direction of the liquid crystal molecules, the standard viewing angle of the liquid crystal display may be increased.

Figure 5:
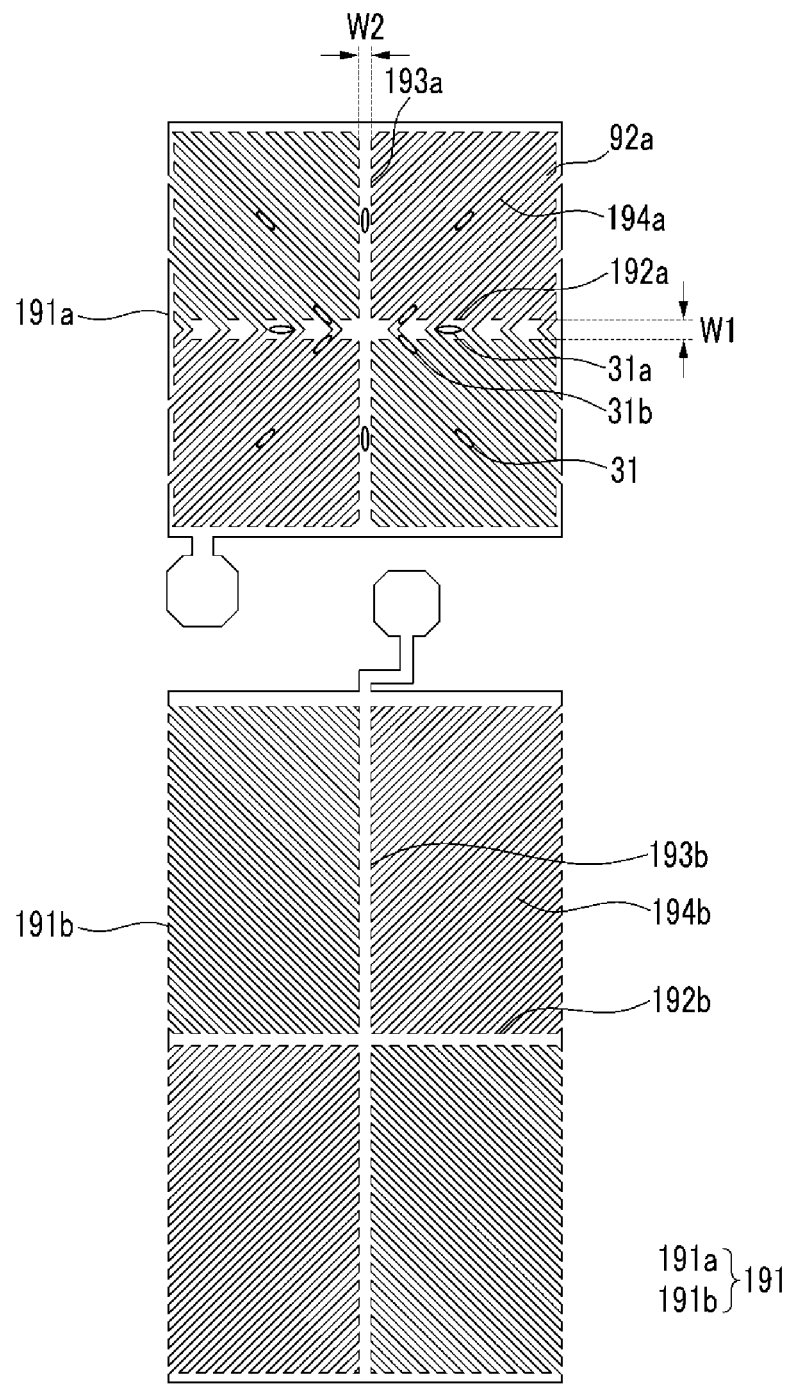
FIG. 5 is a top plan view of one base region of a pixel electrode shown in the liquid crystal display of FIG. 2.

Next, a base region of a pixel electrode of the liquid crystal display shown in FIG. 2 will be described with reference to FIG. 5. FIG. 5 is a top plan view of a base region of a pixel electrode of the liquid crystal display shown in FIG. 2.

Referring to FIG. 5 as well as FIG. 2, the first subpixel electrode 191*a* of the liquid crystal display according to the present exemplary embodiment is similar to the basic electrode 199 shown in FIG. 4. The first subpixel electrode 191*a* may include the cross-shaped stem, including the first transverse stem 192*a* and the first longitudinal stem 193*a* and a plurality of first minute branches 194*a* extending therefrom. A first width W1 of the first transverse stem 192*a* of the first subpixel electrode 191*a* is greater than a second width W2 of the first longitudinal stem 193*a*. The first width W1 of the first transverse stem 192*a* of the first subpixel electrode 191*a* may be greater than the second width W2 of the first longitudinal stem 193*a* by about 1 μm to about 3 μm. In contrast, the widths of the second transverse stem 192*b* and the second longitudinal stem 193*b* of the second subpixel electrode 191*b* are substantially the same. That is, the width of the first transverse stem 192*a* of the first subpixel electrode 191*a* is greater than the width of both the second transverse stem 192*b* and the second longitudinal stem 193*b* of the second subpixel electrode 191*b* and the width of the first longitudinal stem 193*a* of the first subpixel electrode 191*a*.

The first transverse stem 192*a* of the first subpixel electrode 191*a* of the liquid crystal display according to the present exemplary embodiment may be partially disconnected. Accordingly, referring to FIGS. 4 and 5, a portion of a plurality of cutouts defining the third minute branches 194*aa* of the first subregion Da and the portion of a plurality of cutouts defining the fifth minute branches 194*cc* of the third subregion Dc may be connected to each other. Similarly, a portion of a plurality of cutouts defining the fourth minute branches 194*bb* of the second subregion Db and the first cutouts 92*a* among a plurality of cutouts defining the sixth minute branches 194*dd* of the fourth subregion Dd may be connected to each other. Referring to FIG. 5, the first cutouts 92*a* extend in a direction parallel to the first minute branches 194*a* from a portion adjacent to the edge parallel to the data line 171 among an outer edge of the first subpixel electrode 191*a*, pass the first stem 192*a* of the first subpixel electrode 191*a* and bends about 90 degrees, and then again extends to a portion adjacent to the edge parallel to the data line 171. That is, the first cutouts 92*a* among a plurality of cutouts defining the first minute branches 194*a* of the first subpixel electrode 191*a* are also formed in the first stem 192*a* of the first subpixel electrode 191*a*. The first cutouts 92*a* are formed at a predetermined interval to the first transverse stem 192*a*.

As described above, the voltage is applied to the first subpixel electrode 191*a*, and the liquid crystal molecules 31 disposed at the position corresponding to the cross-shaped stem including the first transverse stem 192*a* and the first longitudinal stem 193*a* are inclined in the same direction as the direction in which the first transverse stem 192*a* and the first longitudinal stem 193*a* extend. Accordingly, the slant direction of the liquid crystal molecules 31*a* disposed at the position corresponding to the cross-shaped stem including the first transverse stem 192*a* and the first longitudinal stem 193*a* is a direction parallel to the transmissive axis (not shown) of the polarization layer, and accordingly, the light passing through the liquid crystal layer 3 is blocked, thereby forming a region in which the image may not be displayed. Accordingly, when the width of the first transverse stem 192*a* is increased, the brightness of the light passing through the liquid crystal layer 3 may be reduced in the region occupied by the first subpixel electrode 191*a*. In the liquid crystal display according to an exemplary embodiment of the present invention, the portion of a plurality of cutouts defining the first minute branches 194*a* of the first subpixel electrode 191*a* is formed in the first transverse stem 192*a*. Accordingly, because of the presence of the first cutouts 92*a* of the first transverse stem 192*a*, the second liquid crystal molecules 31*b* disposed in the region in which the first transverse stem 192*a* of the first subpixel electrode 191*a* is disconnected meet and collapse toward each other in the longitudinal center portion of the first subpixel electrode 191*a*, thereby slanting according to the direction parallel to the direction in which the first transverse stem 192*a* extends. In this way, the first cutouts 92*a* disposed at a uniform interval are formed in the partial region of the first transverse stem 192*a* of the first subpixel electrode 191*a* such that the number of liquid crystal molecules slanted in the direction parallel to the first transverse stem 192a of the first subpixel electrode 191a may be increased.

As described above, in the low gray scale region where the magnitude of the data voltage is small, the electric field is applied in the region corresponding to the first subpixel electrode 191a where the applied voltage is relatively large. However, the electric field may not be applied in the region corresponding to the second subpixel electrode 191b charged with a voltage less than the magnitude of the applied data voltage. Accordingly, in the low gray scale region where the magnitude of the data voltage is small, the brightness of the pixel is determined by the brightness of the first subpixel electrode 191a.

In the first subpixel electrode 191a of the liquid crystal display according to the present exemplary embodiment, the width of the first transverse stem 192a among the cross-shaped stems is greater than the width of the first longitudinal stem 193a, and the first transverse stem 192a has the first cutouts 92a extending in parallel to the first minute branches 194a such that the number of liquid crystal molecules slanted according to the first transverse stem 192a of the first subpixel electrode 191a may be increased. Accordingly, the brightness of the region corresponding to the first subpixel electrode 191a may be reduced. Accordingly, in the low gray scale region, the brightness of the entire pixel may be reduced. Therefore, the luminance of the liquid crystal display may be decreased in the low gray scale region such that the correct gray scale expression is possible in the low gray scale region.

The number of liquid crystal molecules 31 slanted in the direction parallel to the extending direction of the first transverse stem 192a is greater than the number of liquid crystal molecules 31 slanted in the direction parallel to the extending direction of the first longitudinal stem 193a. When viewing the liquid crystal molecules 31 slanted in the direction parallel to the extending direction of the first transverse stem 192a from the left side and the right side of the liquid crystal display, the direction of the short axis of the liquid crystal molecules 31 is reorganized. When viewing the liquid crystal molecules 31 slanted in the direction parallel to the extending direction of the first longitudinal stem 193a at the left side and the right side of the liquid crystal display, the direction of the long axis of the liquid crystal molecules 31 is reorganized. Accordingly, in the liquid crystal display according to the present exemplary embodiment, the luminance of the region occupied by the first subpixel electrode 191a may be decreased, and simultaneously, when viewing the liquid crystal display from either the right side or the left side, the short axis of the liquid crystal molecules 31 is reorganized more than the long axis such that deterioration in the display quality, such as a stripe, may be prevented, as compared to a case in which the long axis of the liquid crystal molecules 31 is reorganized more than the short axis.

In this way, in the liquid crystal display according to an exemplary embodiment of the present invention, the pixel electrode disposed in one pixel area is divided into the first subpixel electrode 191a and the second subpixel electrode 191b, the first subpixel electrode 191a and the second subpixel electrode 191b include the cross-shaped stem and a plurality of minute branches extended therefrom, the first width W1 of the first transverse stem 192a of the first subpixel electrode 191a is greater than the second the width W2 of the first longitudinal stem 193a of the first subpixel electrode 191a, and the first transverse stem 192a includes the first cutouts 92a formed in the direction parallel to the minute branches, thereby discontinuously forming the first transverse stem 192a such that the luminance of the liquid crystal display may be reduced in the low gray scale region, and as a result, the correct gray scale expression is possible in the low gray scale region and the lateral visibility may be closer to the front visibility. When viewing the liquid crystal display from the side, the short axis of the liquid crystal molecules 31 may be reorganized more than the long axis, thereby preventing deterioration in viewing quality, such as a stripe shape which may be generated in the case of the reorganization of the long axis of the liquid crystal molecule 31.

Figure 6:
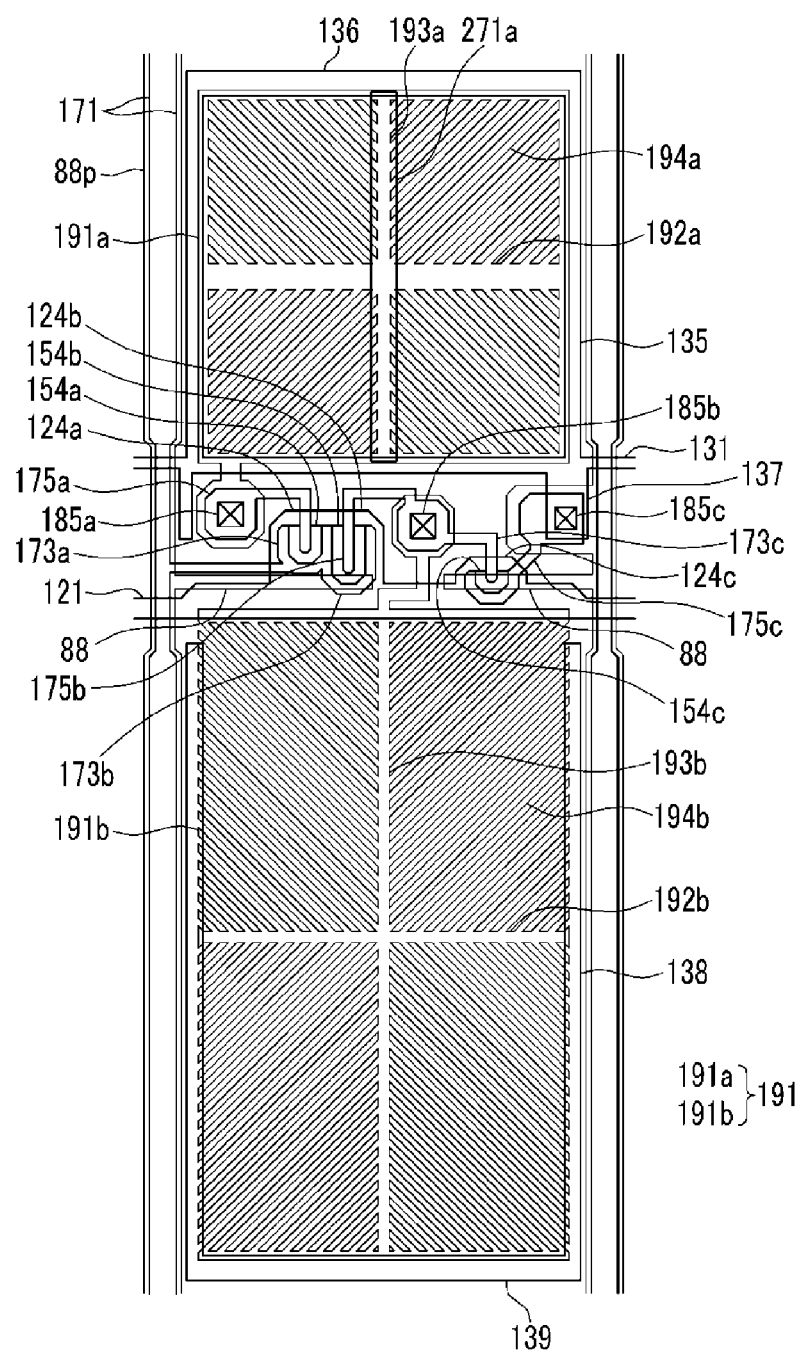
FIG. 6 is a layout view of a liquid crystal display according to another exemplary embodiment of the present invention.

Next, a liquid crystal display according to another exemplary embodiment of the present invention will be described with reference FIG. 6 and FIG. 7. FIG. 6 is a layout view of a liquid crystal display according to another exemplary embodiment of the present invention, and FIG. 7 is a top plan view of one base region of a pixel electrode shown in the liquid crystal display of FIG. 6.

Figure 7:
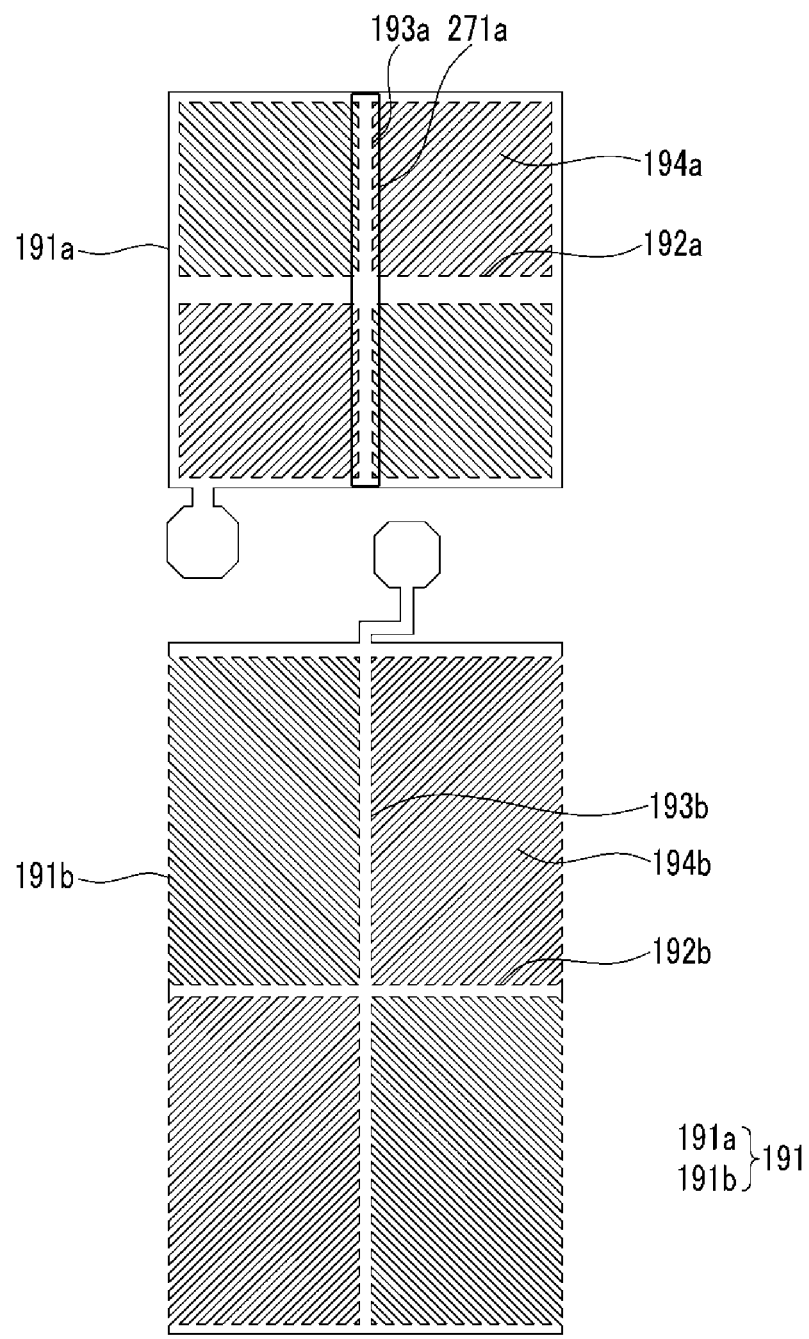
FIG. 7 is a top plan view of one base region of a pixel electrode shown in the liquid crystal display of FIG. 6.

Referring to FIG. 6 and FIG. 7, the liquid crystal display according to the present exemplary embodiment is similar to the liquid crystal display according to the exemplary embodiment of FIG. 2 to FIG. 5. The description of the same constituent elements is omitted.

Next, referring to FIG. 7, a shape of the first subpixel electrode 191a of the liquid crystal display according to the present exemplary embodiment will be described.

In the liquid crystal display according to the present exemplary embodiment, as opposed to the liquid crystal display according to the exemplary embodiment shown in FIG. 2 to FIG. 5, the first transverse stem 192a of the first subpixel electrode 191a may not include the first cutouts 92a, and the first transverse stem 192a may be continuously formed. A common electrode 270 of the upper panel 200 has second cutouts 271a formed at the position corresponding to the first longitudinal stem 193a of the first subpixel electrode 191a. The width of the second cutouts 271a may be in a range of about 2 μm to about 8 μm. According to the liquid crystal display according to another exemplary embodiment of the present invention, the common electrode 270 may further include an additional cutout (not shown) formed at a position corresponding to the second longitudinal stem 193b of the second subpixel electrode 191b. According to the liquid crystal display according to another exemplary embodiment of the present invention, the common electrode 270 may further include an additional cutout (not shown) formed at the position corresponding to the second transverse stem 192b of the second subpixel electrode 191b.

In this way, in the case of the liquid crystal display of the present exemplary embodiment, the width of the first transverse stem 192a of the first subpixel electrode 191a is greater than the width of the first longitudinal stem 193a, and the common electrode 270 of the upper panel 200 has the second cutout 271a at the position corresponding to the first longitudinal stem 193a of the first subpixel electrode 191a. Accordingly, the transmittance of the light of the first longitudinal stem 193a of the first subpixel electrode 191a is higher than the transmittance of the light of the first transverse stem 192a of the first subpixel electrode 191a. That is, similar to the liquid crystal display according to the exemplary embodiment shown in FIG. 2 to FIG. 5, by reducing the transmittance of the first transverse stem 192a of the first subpixel electrode 191a, the entire luminance of the liquid crystal display may be reduced in the low gray scale region such that the correct gray scale expression is possible in the low gray scale region, and the lateral visibility may be close to the front visibility.

Next, referring to FIG. 8, an operation of the liquid crystal molecules according to the second cutout 271a of the common electrode 270 of the upper panel 200 will be described.

FIG. 8 is a schematic view illustrating an operation of liquid crystal molecules of the liquid crystal display shown in FIG. 6 and FIG. 7.

In FIG. 8, the operation of the liquid crystal molecules on the transverse stem 192 of the pixel electrode is shown in (a), and the operation of the liquid crystal molecules on the longitudinal stem 193 of the pixel electrode is shown in (b).

Referring to FIG. 8, in the region corresponding to the transverse stem 192 of the pixel electrode, the common electrode 270 may not have the cutout, but the common electrode may have the cutout 271 in the region corresponding to the longitudinal stem 193 of the pixel electrode.

As shown, in the region corresponding to the transverse stem 192 of the pixel electrode, the liquid crystal molecules are not influenced by a fringe field formed between the adjacent minute branches 194 and the common electrode 270 such that the liquid crystal molecules are not inclined in the predetermined direction. However, the common electrode 270 has cutouts 271 formed in the region corresponding to the longitudinal stem 193 of the pixel electrode such that the liquid crystal molecules disposed in the region corresponding to the longitudinal stem 193 are influenced by a fringe field generated by the cutouts 271 of the common electrode 270. Accordingly, the liquid crystal molecules may be inclined in the direction parallel to the adjacent minute branch 194. Therefore, the transmittance of the region corresponding to the transverse stem of the pixel electrode is lower than the transmittance of the region corresponding to the longitudinal stem of the pixel electrode. Accordingly, in the low gray scale region, the entire luminance of the liquid crystal display may be reduced such that the correct gray scale expression is possible in the low gray scale region, and the lateral visibility may be close to the front visibility.

Many features of the liquid crystal display according to the exemplary embodiment described with reference to FIG. 2 to FIG. 5 may be applied to the liquid crystal display according to the present exemplary embodiment.

Figure 9:
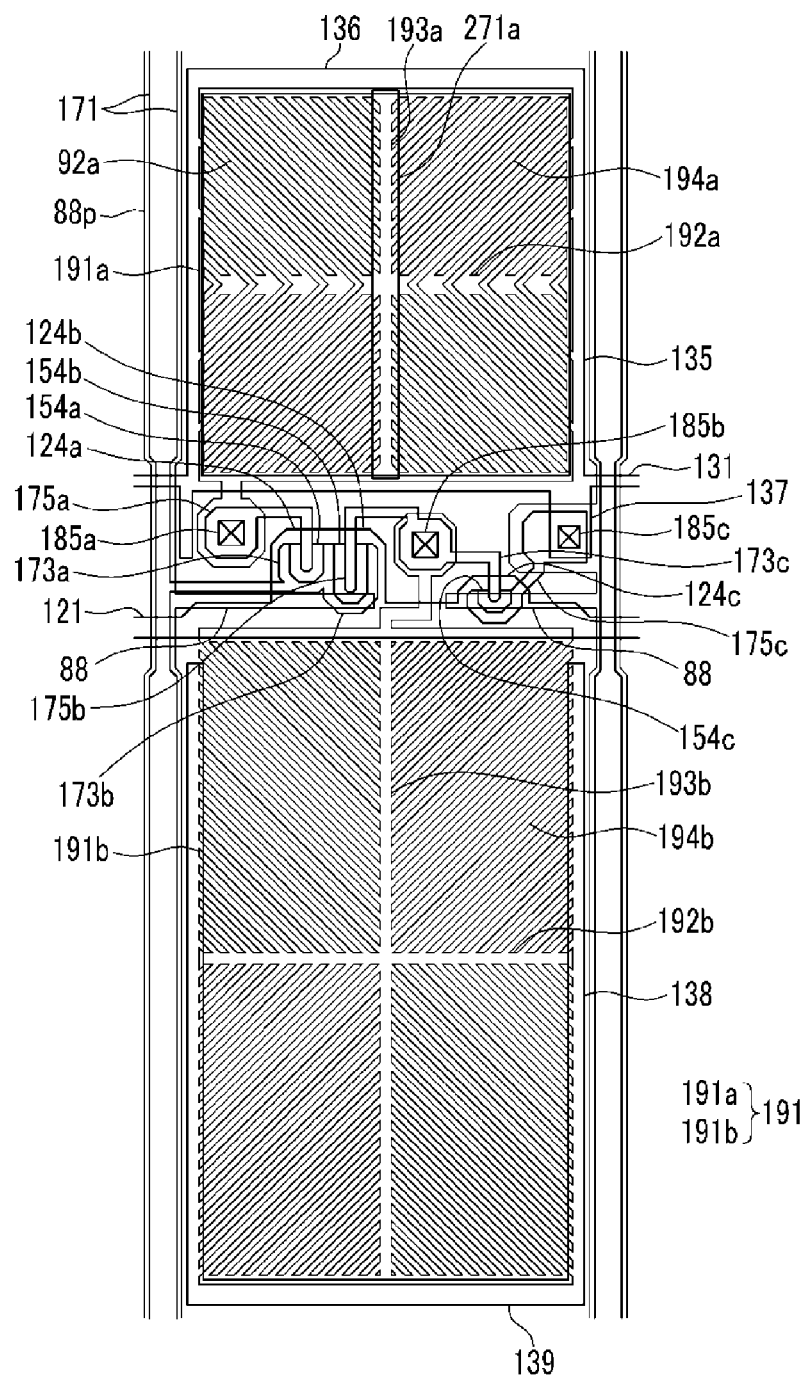
FIG. 9 is a layout view of the liquid crystal display according to another exemplary embodiment of the present invention.

Next, a liquid crystal display according to another exemplary embodiment of the present invention will be described with reference to FIG. 9 and FIG. 10. FIG. 9 is a layout view of the liquid crystal display according to another exemplary embodiment of the present invention, and FIG. 10 is a top plan view of one base region of a pixel electrode shown in the liquid crystal display of FIG. 9.

Figure 10:
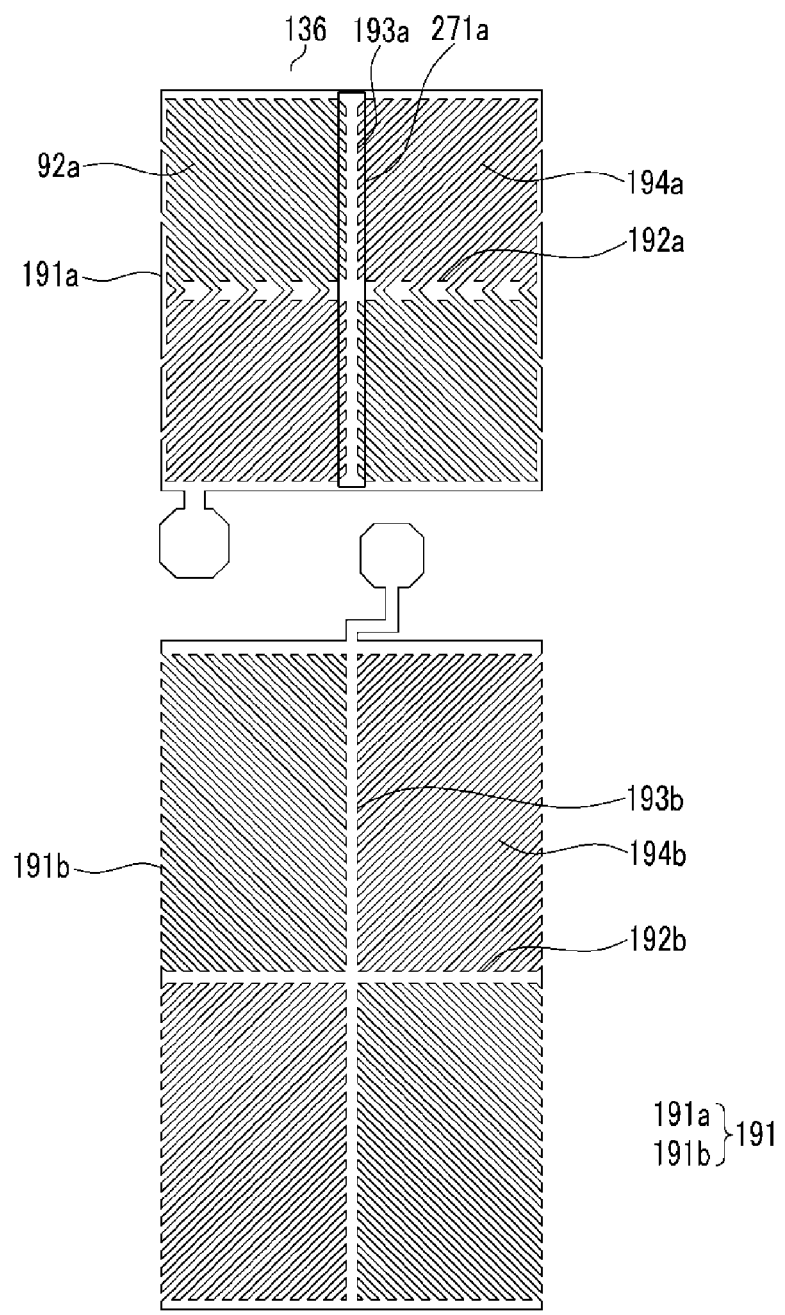
FIG. 10 is a top plan view of one base region of a pixel electrode shown in the liquid crystal display of FIG. 9.

Referring to FIG. 9 and FIG. 10, the liquid crystal display according to the present exemplary embodiment is similar to the liquid crystal display according to the exemplary embodiment of FIG. 2 to FIG. 5. The description of the same constituent elements is omitted.

In the liquid crystal display according to the present exemplary embodiment, as opposed to the liquid crystal display according to the exemplary embodiment shown in FIG. 2 to FIG. 5, the common electrode 270 of the upper panel 200 has the second cutout 271a formed at the position corresponding to the first longitudinal stem 193a of the first subpixel electrode 191a. The width of the second cutout 271a may be in a range of about 2 μm to about 8 μm. According to the liquid crystal display according to another exemplary embodiment of the present invention, the common electrode 270 may further include an additional cutout (not shown) formed at the position corresponding to the second longitudinal stem 193b of the second subpixel electrode 191b. According to the liquid crystal display according to another exemplary embodiment of the present invention, the common electrode 270 may further include an additional cutout (not shown) formed at the position corresponding to the second transverse stem 192b of the second subpixel electrode 191b.

In this way, in the case of the liquid crystal display of the present exemplary embodiment, the width of the first transverse stem 192a of the first subpixel electrode 191a is greater than the width of the first longitudinal stem 193a, the first transverse stem 192a has the first cutout 92a parallel to the first minute branch 194a, and the common electrode 270 of the upper panel 200 has the second cutout 271a formed at the position corresponding to the first longitudinal stem 193a of the first subpixel electrode 191a. Accordingly, the transmittance of the light of the first longitudinal stem 193a of the first subpixel electrode 191a is higher than the transmittance of the light of the first transverse stem 192a of the first subpixel electrode 191a. That is, similar to the liquid crystal display according to the exemplary embodiment shown in FIG. 2 to FIG. 5, by reducing the transmittance of the first transverse stem 192a of the first subpixel electrode 191a, the entire luminance of the liquid crystal display may be reduced in the low gray scale region such that the correct gray scale expression is possible in the low gray scale region, and the lateral visibility may be close to the front visibility.

Many features of the liquid crystal display according to the exemplary embodiment described with reference to FIG. 2 to FIG. 5 and the liquid crystal display of the exemplary embodiment described with reference to FIG. 6 and FIG. 7 may be applied to the liquid crystal display according to the present exemplary embodiment.

Figure 11:
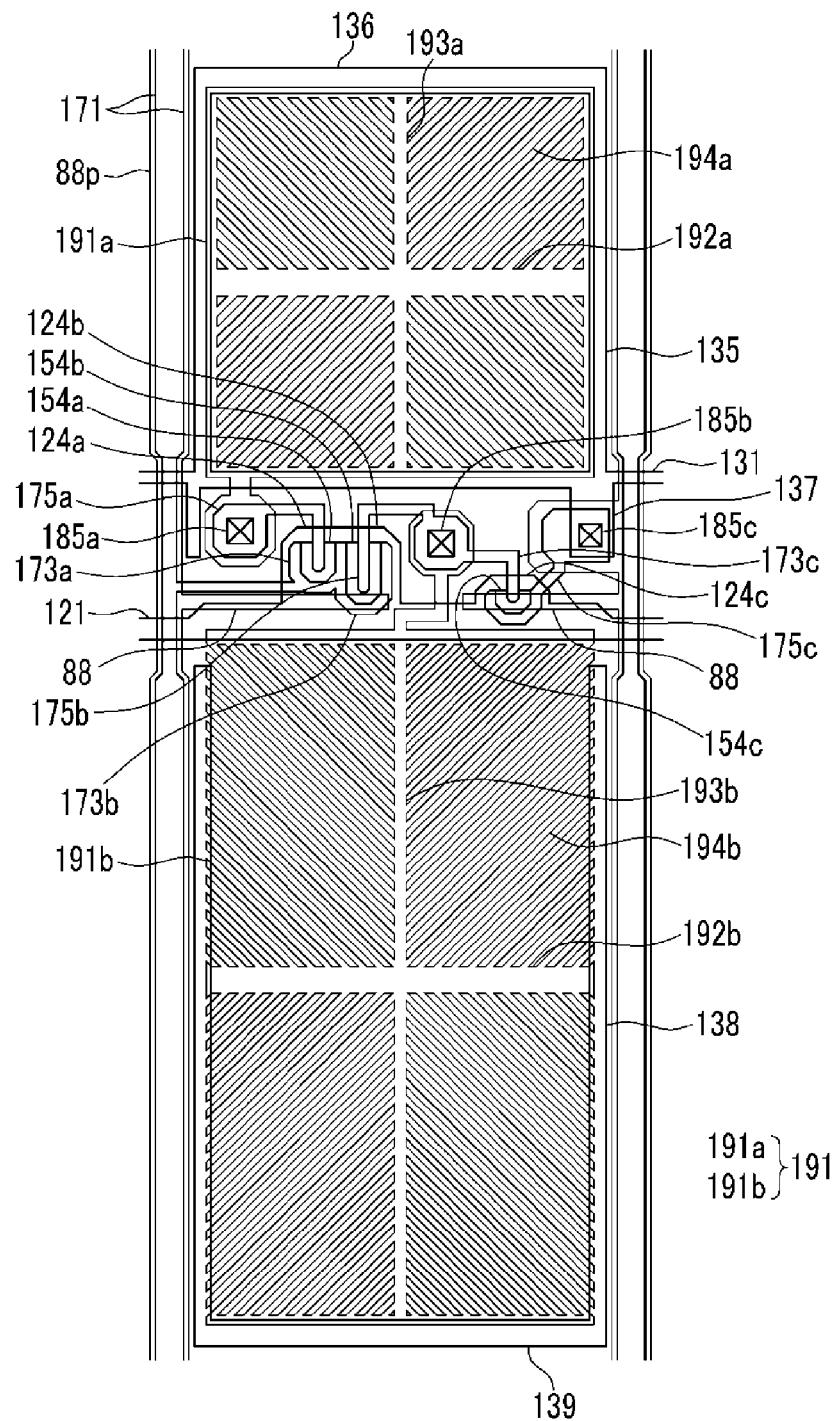
FIG. 11 is a layout view of the liquid crystal display according to another exemplary embodiment of the present invention.

Next, a liquid crystal display according to another exemplary embodiment of the present invention will be described with reference to FIG. 11 and FIG. 12. FIG. 11 is a layout view of the liquid crystal display according to another exemplary embodiment of the present invention, and FIG. 12 is a top plan view of one base region of a pixel electrode shown in the liquid crystal display of FIG. 11.

Figure 12:
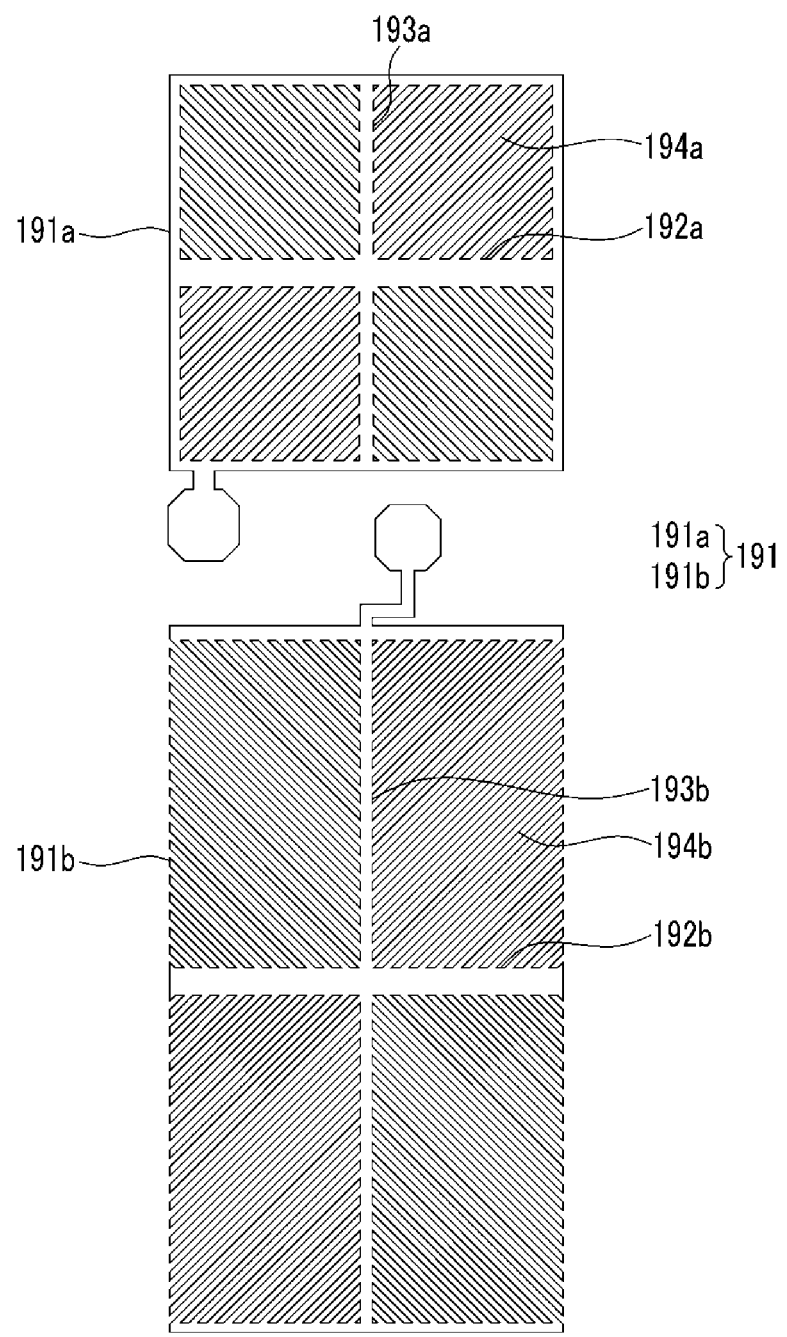
FIG. 12 is a top plan view of one base region of a pixel electrode shown in the liquid crystal display of FIG. 11.

Referring to FIG. 11 and FIG. 12, the liquid crystal display according to the present exemplary embodiment is similar to the liquid crystal display according to the exemplary embodiment of FIG. 2 to FIG. 5. The description of the same constituent elements is omitted.

However, in the liquid crystal display according to the present exemplary embodiment, as opposed to the liquid crystal display shown in FIG. 2 to FIG. 5, the width of the second transverse stem 192b of the second subpixel electrode 191b is greater than the width of the second longitudinal stem 193b of the second subpixel electrode 191b. The width of the first transverse stem 192a of the first subpixel electrode 191a may be greater than the width of the first longitudinal stem 193a by about 1 μm to about 3 μm, and the width of the second transverse stem 192b of the second subpixel electrode 191b may be greater than the width of the second longitudinal stem 193b by about 1 μm to about 3 μm. The first transverse stem 192a of the first subpixel electrode 191a may not include the first cutout 92a.

Accordingly, the first subpixel electrode 191a of the liquid crystal display according to the present exemplary embodiment may include the cross-shaped stem including the first transverse stem 192a and the first longitudinal stem 193a, and a plurality of the first minute branches 194a extending therefrom, and the second subpixel electrode 191b has the cross-shaped stem including the second transverse stem 192b and the second longitudinal stem 193b, and a plurality of the second minute branch 194b extending therefrom.

The width of the first transverse stem 192a of the first subpixel electrode 191a is greater than the width of the first longitudinal stem 193a, and the width of the second transverse stem 192b of the second subpixel electrode 191b is greater than the width of the second longitudinal stem 193b.

In the cross-shaped stem of the first subpixel electrode 191*a* of the liquid crystal display according to the present exemplary embodiment, the width of the first transverse stem 192*a* is greater than the width of the first longitudinal stem 193*a* such that the brightness of the region corresponding to the first subpixel electrode 191*a* may be reduced. Accordingly, in the low gray scale region, the brightness of the entire pixel may be reduced. Therefore, the luminance of the liquid crystal display may be reduced in the low gray scale region such that the correct gray scale expression is possible in the low gray scale region. In the cross-shaped stem of the second subpixel electrode 191*b*, the width of the second transverse stem 192*b* is greater than the width of second longitudinal stem 193*b* to reduce the luminance of the liquid crystal display in the high gray scale region such that the deterioration of the display quality generated according to the increasing of the luminance in the high gray scale region may be prevented.

In this way, in the liquid crystal display according to an exemplary embodiment of the present invention, the pixel electrode disposed in one pixel area is divided into the first subpixel electrode 191*a* and the second subpixel electrode 191*b*, the first subpixel electrode 191*a* and the second subpixel electrode 191*b* include the cross-shaped stem and a plurality of minute branches extended therefrom, the width of the first transverse stem 192*a* of the first subpixel electrode 191*a* is greater than the width of the first longitudinal stem 193*a* of the first subpixel electrode 191*a*, and the width of the second transverse stem 192*b* of the second subpixel electrode 191*b* is greater than the width of the second longitudinal stem 193*b* of the second subpixel electrode 191*b* such that the luminance of the liquid crystal display may be reduced in the low gray scale region and the high gray scale region. As a result, the correct gray scale expression is possible in the low gray scale region and the high gray scale region, and the lateral visibility may be closer to the front visibility. When viewing the liquid crystal display from the side, the short axis of the liquid crystal molecules 31 may be reorganized more than the long axis, thereby preventing deterioration in viewing quality, such as the stripe shape, which may be generated in the case of the reorganized long axis of the liquid crystal molecule 31.

Many features of the liquid crystal display according to the exemplary embodiment described with reference to FIG. 2 to FIG. 5 may be applied to the liquid crystal display according to the current exemplary embodiment.

Figure 13:
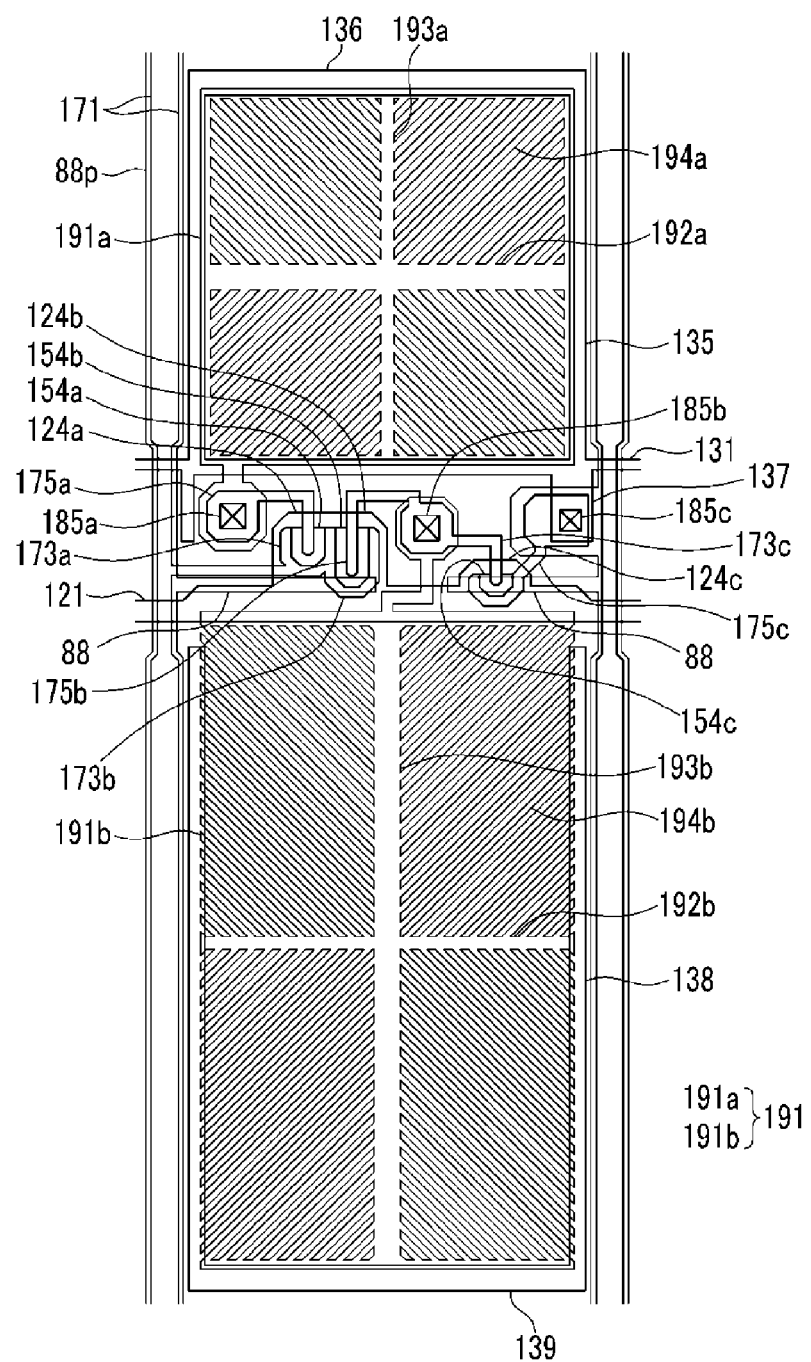
FIG. 13 is a layout view of the liquid crystal display according to another exemplary embodiment of the present invention.

Next, a liquid crystal display according to another exemplary embodiment of the present invention will be described with reference to FIG. 13 and FIG. 14. FIG. 13 is a layout view of the liquid crystal display according to another exemplary embodiment of the present invention, and FIG. 14 is a top plan view of one base region of a field generating electrode shown in the liquid crystal display of FIG. 13.

Figure 14:
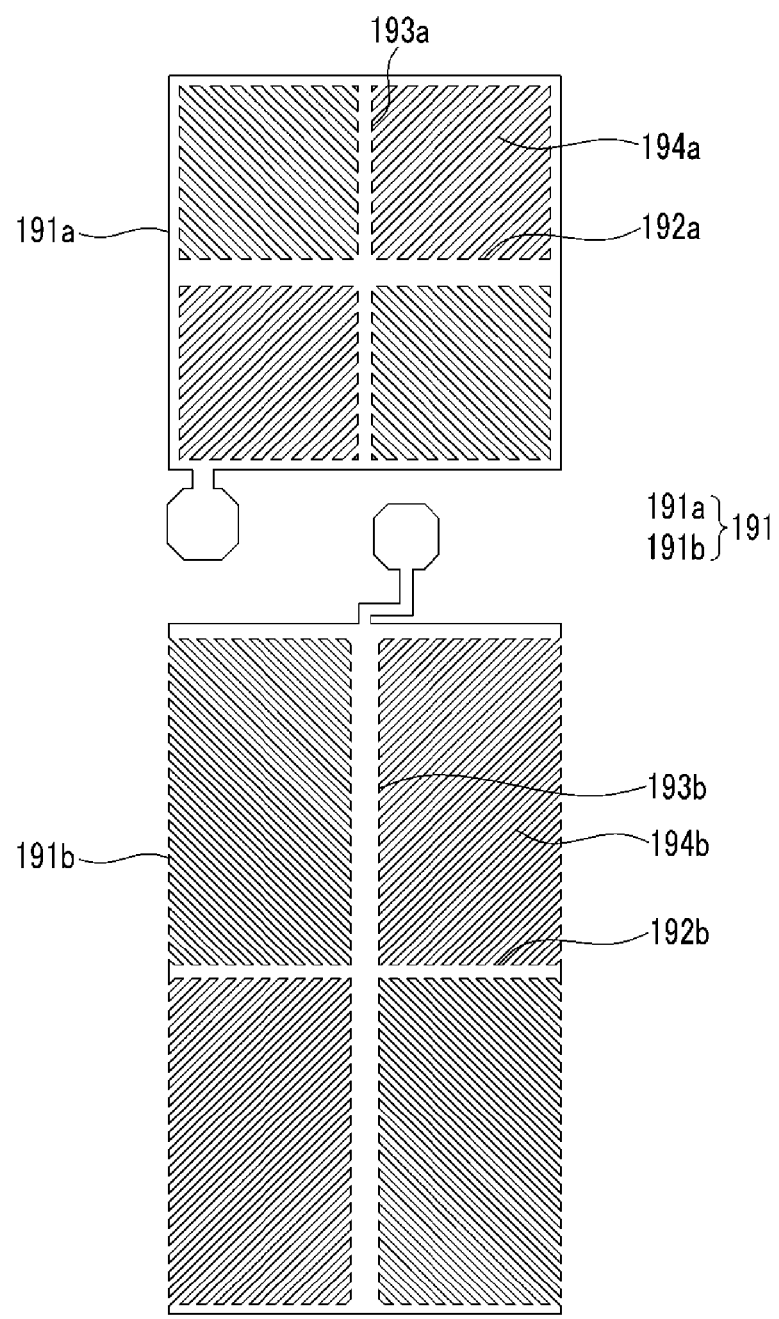
FIG. 14 is a top plan view of one base region of a field generating electrode shown in the liquid crystal display of FIG. 13.

Referring to FIG. 13 and FIG. 14, the liquid crystal display according to the present exemplary embodiment is similar to the liquid crystal display according to the exemplary embodiment of FIG. 2 to FIG. 5. The description of the same constituent elements is omitted.

However, in the liquid crystal display according to the present exemplary embodiment, as opposed to the liquid crystal display shown in FIG. 2 to FIG. 5, the width of the second longitudinal stem 193*b* of the second subpixel electrode 191*b* is greater than the width of the second transverse stem 192*b* of the second subpixel electrode 191*b*. The first cutout 92*a* is not formed in the first transverse stem 192*a* of the first subpixel electrode 191*a*.

Accordingly, the first subpixel electrode 191*a* of the liquid crystal display according to the present exemplary embodiment includes the cross-shaped stem having the first transverse stem 192*a* and the first longitudinal stem 193*a*, and a plurality of the first minute branches 194*a* extending therefrom, and the second subpixel electrode 191*b* includes the cross-shaped stem of the second transverse stem 192*b* and the second longitudinal stem 193*b*, and a plurality of the second minute branches 194*b* extending therefrom.

The width of the first transverse stem 192*a* of the first subpixel electrode 191*a* is greater than the width of the first longitudinal stem 193*a*, and the width of the second longitudinal stem 193*b* of the second subpixel electrode 191*b* is greater than the width of the second transverse stem 192*b* of the second subpixel electrode 191*b*.

In the cross-shaped stem of the first subpixel electrode 191*a* of the liquid crystal display according to the present exemplary embodiment, the width of the first transverse stem 192*a* is greater than the width of the first longitudinal stem 193*a* such that the brightness of the region corresponding to the first subpixel electrode 191*a* may be reduced. Accordingly, in the low gray scale region, the brightness of the entire pixel may be reduced. Therefore, the luminance of the liquid crystal display may be reduced in the low gray scale region such that the correct gray scale expression is possible in the low gray scale region. The width of the second longitudinal stem 193*b* is greater than the width of the second transverse stem 192*b* of the second subpixel electrode 191*b* to reduce the luminance of the liquid crystal display in the high gray scale region such that the deterioration of the display quality generated according to the increasing of the luminance in the high gray scale region may be prevented.

Many features of the liquid crystal display according to the exemplary embodiment described with reference to FIG. 2 to FIG. 5 may be applied to the liquid crystal display according to the present exemplary embodiment.

Figure 15:
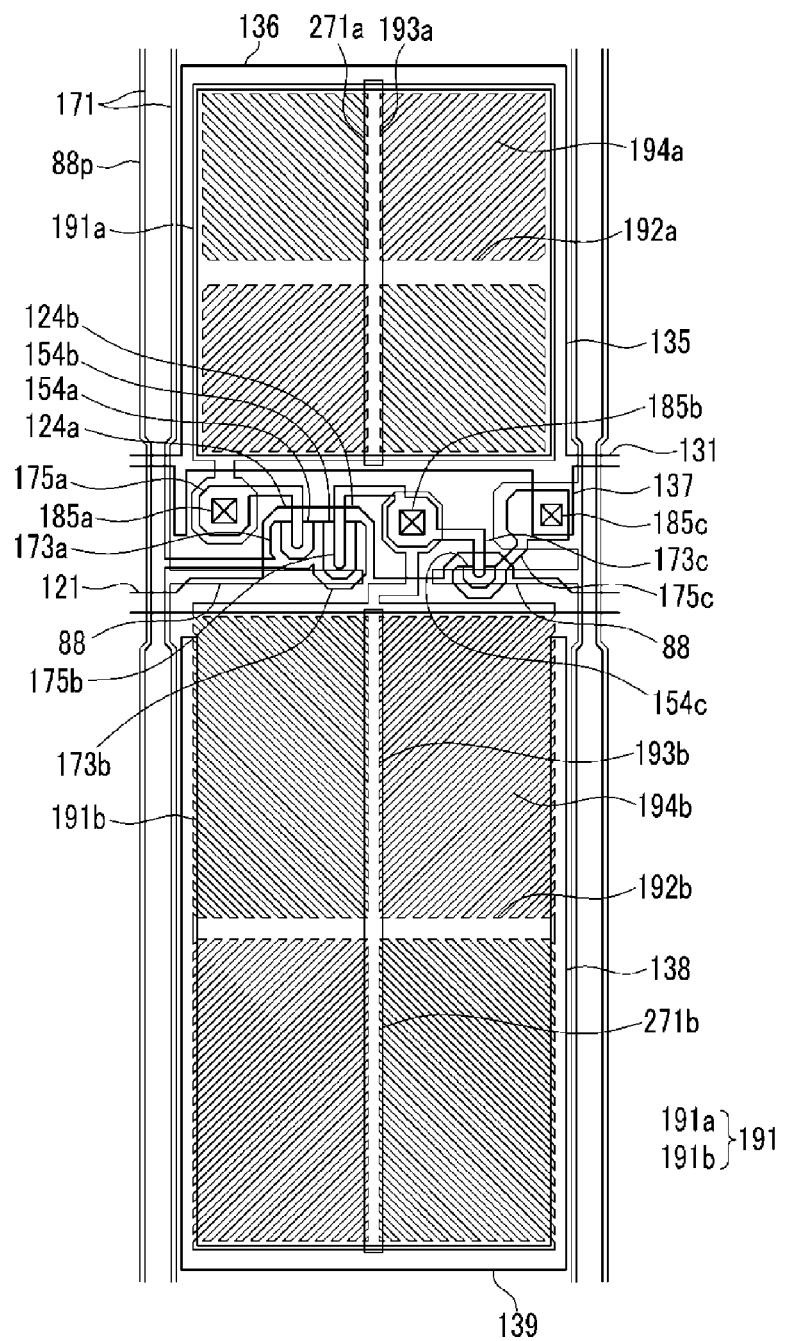
FIG. 15 is a layout view of the liquid crystal display according to another exemplary embodiment of the present invention.

Next, a liquid crystal display according to another exemplary embodiment of the present invention will be described with reference to FIG. 15 and FIG. 16. FIG. 15 is a layout view of the liquid crystal display according to another exemplary embodiment of the present invention, and FIG. 16 is a top plan view of one base region of a field generating electrode shown in the liquid crystal display of FIG. 15.

Figure 16:
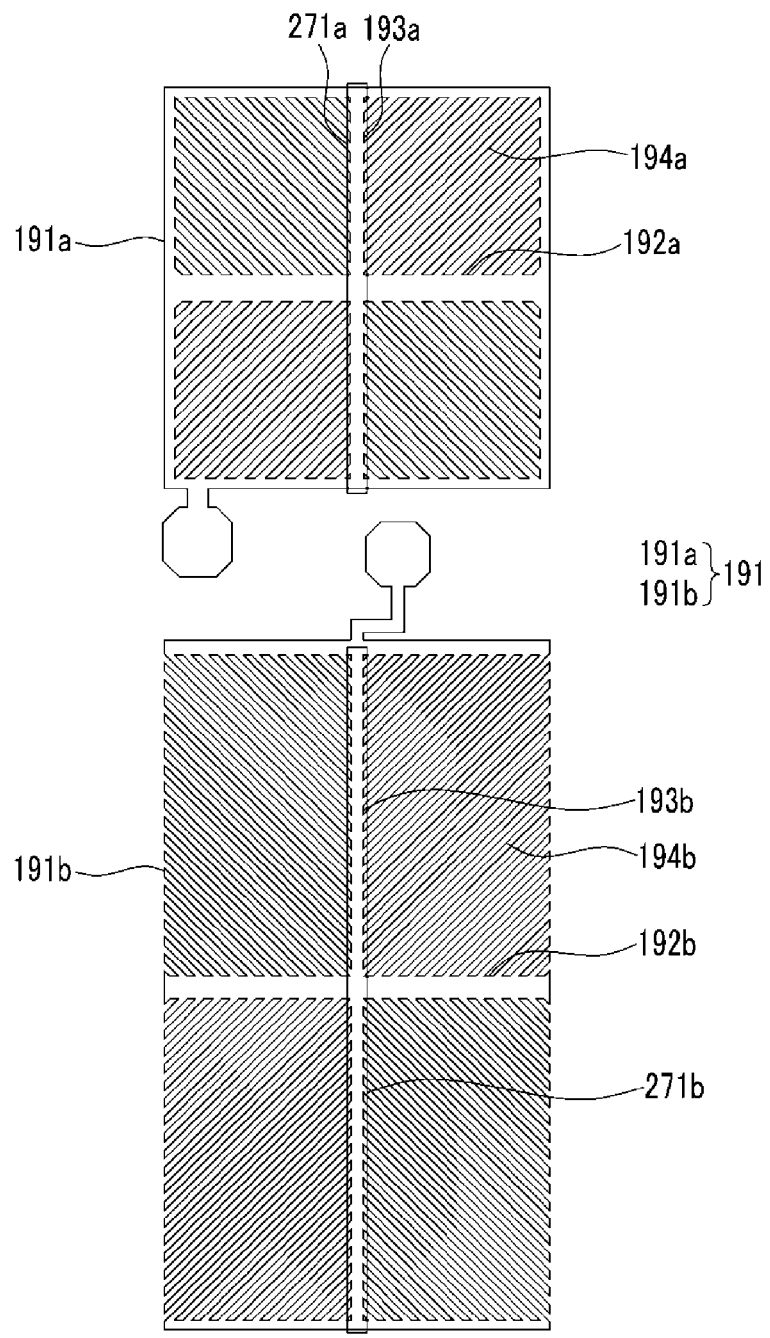
FIG. 16 is a top plan view of one base region of a field generating electrode shown in the liquid crystal display of FIG. 15.

Referring to FIG. 15 and FIG. 16, the liquid crystal display according to the present exemplary embodiment is similar to the liquid crystal display according to the exemplary embodiment of FIG. 2 to FIG. 5, the liquid crystal display according to the exemplary embodiment of FIG. 6 and FIG. 7, and the liquid crystal display according to the exemplary embodiment of 11 and FIG. 12. The description of the same constituent elements is omitted.

However, in the liquid crystal display according to the present exemplary embodiment, as opposed to the liquid crystal displays according to the previously-described exemplary embodiments, the width of the first transverse stem 192*a* of the first subpixel electrode 191*a* is not only greater than the width of the first longitudinal stem 193*a*, but also the width of the second transverse stem 192*b* of the second subpixel electrode 191*b* is greater than the width of the second longitudinal stem 193*b*. The width of the first transverse stem 192*a* of the first subpixel electrode 191*a* may be greater than the width of the first longitudinal stem 193*a* by about 1 μm to about 3 μm, and the width of the second transverse stem 192*b* of the second subpixel electrode 191*b* may be greater than the width of the second longitudinal stem 193*b* by about 1 μm to about 3 μm. The common electrode 270 of the upper panel 200 has the second cutout 271*a* formed at the position corresponding to the first longitudinal stem 193*a* of the first subpixel electrode 191*a* and the third cutout 271*b* formed at the position corresponding to the second longitudinal stem 193*b* of the second subpixel electrode 191*b*. The width of the second cutout 271*a* and the third cutout 271*b* may be in a range of about 2 μm to about 8 μm. However, according to the liquid crystal display according to another exemplary embodiment of the present invention, the third cutout 271*b* of the common electrode 270 may be omitted. According to the liquid crystal display according to another exemplary embodiment of the present invention, the third cutout 271*b* of the common electrode 270 is not formed at the position corresponding to the second longitudinal stem 193*b* of the second subpixel electrode 191*b*, and may be formed at the position corresponding to the second transverse stem 192*b* of the second subpixel electrode 191*b*.

In this way, in the case of the liquid crystal display according to the present exemplary embodiment, the width of the first transverse stem 192*a* of the first subpixel electrode 191*a* is greater than the width of the first longitudinal stem 193*a*, and the common electrode 270 of the upper panel 200 has the second cutout 271*a* formed at the position corresponding to the first longitudinal stem 193*a* of the first subpixel electrode 191*a*. Accordingly, the transmittance of the light of the first longitudinal stem 193*a* of the first subpixel electrode 191*a* is higher than the transmittance of the light of the first transverse stem 192*a* of the first subpixel electrode 191*a*. That is, similar to the liquid crystal display according to the exemplary embodiment shown in FIG. 2 to FIG. 5, by reducing the transmittance of the first transverse stem 192*a* of the first subpixel electrode 191*a*, the entire luminance of the liquid crystal display may be reduced in the low gray scale region such that the correct gray scale expression is possible in the low gray scale region, and the lateral visibility may be close to the front visibility.

In the case of the liquid crystal display according to the present exemplary embodiment, the width of the second transverse stem 192*b* of the second subpixel electrode 191*b* is greater than the width of the second longitudinal stem 193*b*, and the common electrode 270 has the third cutout 271*b* formed at the position corresponding to the second longitudinal stem 193*b* of the second subpixel electrode 191*b*. Accordingly, the transmittance of the light for the second transverse stem 192*b* of the second subpixel electrode 191*b* is higher than the transmittance of the light for the second longitudinal stem 193*b* of the second subpixel electrode 191*b*. However, as described above, according to the liquid crystal display according to another exemplary embodiment of the present invention, the third cutout 271*b* of the common electrode 270 may be omitted. According to the liquid crystal display according to another exemplary embodiment of the present invention, the third cutout 271*b* of the common electrode 270 is not formed at the position corresponding to the second longitudinal stem 193*b* of the second subpixel electrode 191*b*, and may be formed at the position corresponding to the second transverse stem 192*b* of the second subpixel electrode 191*b*. Therefore, the luminance of the liquid crystal display may be reduced in the high gray scale region such that the deterioration of the display quality generated according to the increasing of the luminance may be prevented in the high gray scale region.

Many features of the liquid crystal display according to the present exemplary embodiment are similar to those of the liquid crystal display according to the exemplary embodiment of FIG. 2 to FIG. 5, the liquid crystal display according to the exemplary embodiment of FIG. 6 and FIG. 7, and the liquid crystal display according to the exemplary embodiment of 11 and FIG. 12 so they may be applied to the liquid crystal display of the present exemplary embodiment.

Figure 17:
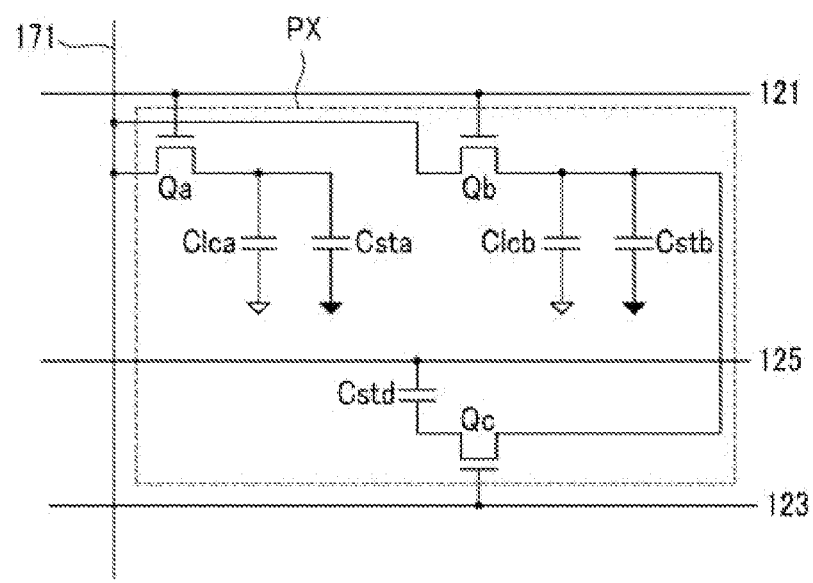
FIG. 17 is an equivalent circuit diagram of one pixel of a liquid crystal display according to another exemplary embodiment of the present invention.
Figure 18:
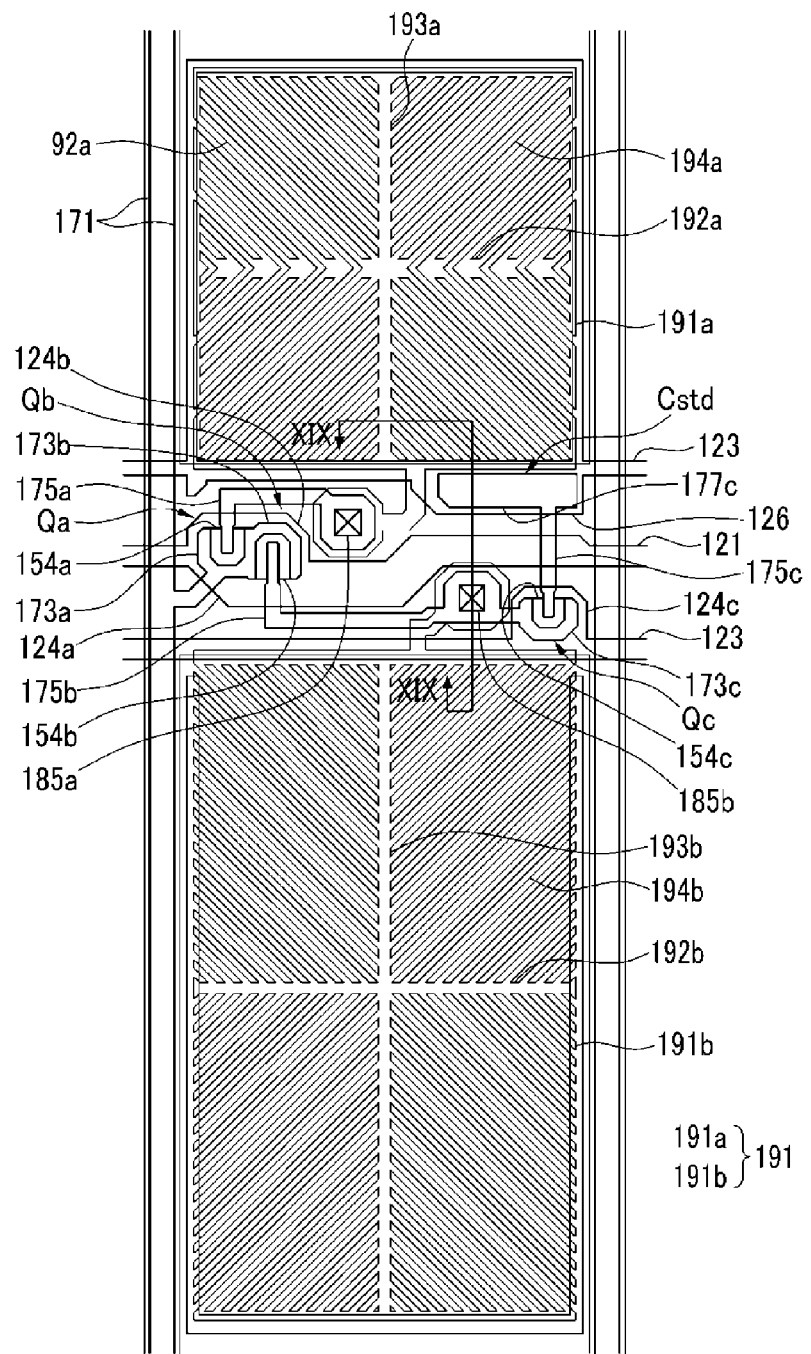
FIG. 18 is a layout view of the liquid crystal display according to another exemplary embodiment of the present invention.
Figure 19:
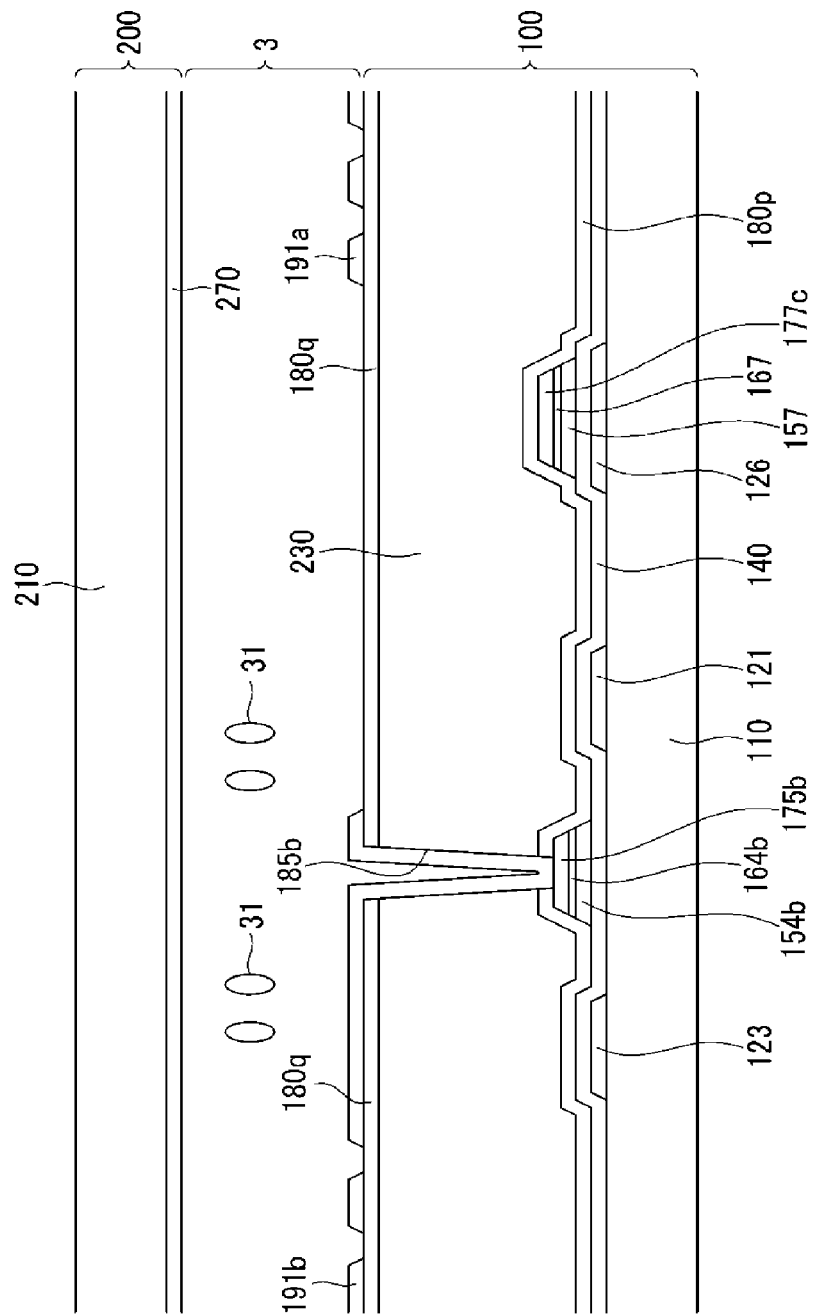
FIG. 19 is a cross-sectional view of the liquid crystal display of FIG. 18 taken along line XIX-XIX.
Figure 20:
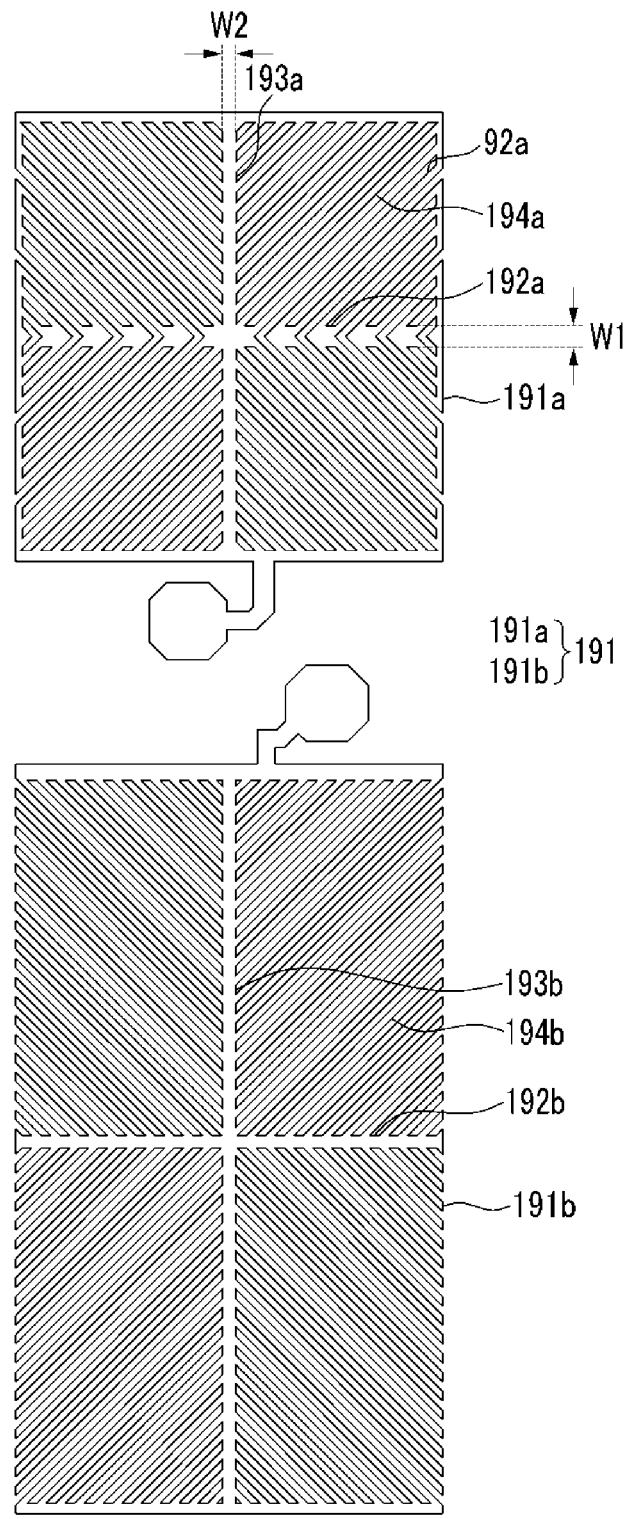
FIG. 20 is a top plan view of one base region of a pixel electrode shown in the liquid crystal display of FIG. 18.

Next, a liquid crystal display according to another exemplary embodiment of the present invention will be described with reference to FIG. 17 to FIG. 20. FIG. 17 is an equivalent circuit diagram of one pixel of a liquid crystal display according to another exemplary embodiment of the present invention, FIG. 18 is a layout view of the liquid crystal display according to another exemplary embodiment of the present invention, FIG. 19 is a cross-sectional view of the liquid crystal display of FIG. 18 taken along line XIX-XIX, and FIG. 20 is a top plan view of one base region of a pixel electrode shown in the liquid crystal display of FIG. 18.

Referring to FIG. 17, a liquid crystal display according to an exemplary embodiment of the present invention includes signal lines including a gate line 121, a storage electrode line 125, a step-down gate line 123, and a data line 171, and a pixel PX connected thereto.

The pixel PX includes first to third switching elements Qa, Qb, and Qc, first and second liquid crystal capacitors Clca and Clcb, first and second storage capacitors Csta and Cstb, and a step-down capacitor Cstd. Here, the first to third switching elements Qa, Qb, and Qc are thin film transistors, and will be denoted by the same reference numerals, respectively.

The first and second thin film transistors Qa and Qb are respectively connected to the gate line 121 and the data line 171, and the third thin film transistor Qc is connected to the step-down gate line 123.

The first and second thin film transistors Qa and Qb are three-terminal elements provided in the lower panel 100, each having a control terminal connected to the gate line 121, an input terminal connected to the data line 171, and an output terminal connected to the first and second liquid crystal capacitors Clca and Clcb and the first and second storage capacitors Csta and Cstb.

The third thin film transistor Qc as a three-terminal element provided in the lower panel 100 has a control terminal connected to the step-down gate line 123, an input terminal connected to the second liquid crystal capacitor Clcb, and an output terminal connected to the step-down capacitor Cstd.

The first and second liquid crystal capacitors Clca and Clcb are formed by overlapping first and second subpixel electrodes 191*a* and 191*b* connected to the first and second switching elements Qa and Qb and the common electrode 270 of the upper panel 200 to each other.

The step-down capacitor Cstd is connected to the output terminal of the third thin film transistor Qc and the storage electrode line 125, and the storage electrode line 125 provided in the lower panel 100 and the output terminal of the third thin film transistor Qc overlap each other via an insulator.

Next, a driving method of the liquid crystal display shown in FIG. 17 will be described.

If the gate-on signal is applied to the gate line 121, the first switching element Qa and the second switching element Qb connected thereto are turned on. Accordingly, the data voltage applied to the data line 171 is applied to the first sub-pixel electrode and the second sub-pixel electrode through the turned on first switching element Qa and second switching element Qb. At this time, the data voltages applied to the first sub-pixel electrode 191*a* and the second sub-pixel electrode 191*b* have the same magnitude. Accordingly, the voltages charged to the first and second liquid crystal capacitors Clca and Clcb are the same. Next, if the gate-off signal is applied to the gate line 121 and the gate-on signal is applied to the step-down gate line 123, the first switching element Qa and the second switching element Qb are turned off and the third switching element Qc is turned on. Thus, the charge is moved from the second sub-pixel electrode 191*b* to the step-down capacitor Cstd through the third switching element Qc. Thus, the charge voltage of the second liquid crystal capacitor Clcb is decreased and the step-down capacitor Cstd is charged. The charge voltage of the second liquid crystal capacitor Clcb is decreased by the capacitance of the step-down capacitor Cstd such that the charge voltage of the second liquid crystal capacitor Clcb is less than the charge voltage of the first liquid crystal capacitor Clca.

At this time, charge voltages of two liquid crystal capacitors Clca and Clcb represent different gamma curves, and the gamma curve of one pixel voltage is a combination curved line of the different gamma curves. The front combination gamma curve coincides with the reference gamma curve at the optimally-determined front side, and the lateral gamma curve approximates the front reference gamma curve. In this way, the image data are converted so that the lateral visibility is improved.

Next, the liquid crystal display shown in FIG. 17 will be described with reference to FIG. 18 and FIG. 19.

Referring to FIG. 18 and FIG. 19, the liquid crystal display according to the present exemplary embodiment includes the lower panel 100 and the upper panel 200 facing each other, a liquid crystal layer 3 interposed between the two display panels 100 and 200, and a pair of polarizers (not shown) attached at the outer surfaces of the display panels 100 and 200.

Now, the lower panel 100 will be described.

A plurality of gate conductors including a plurality of gate lines 121, a plurality of step-down gate lines 123, and a plurality of storage electrode lines 125 are formed on an insulation substrate 110.

The gate lines 121 and the step-down gate lines 123 transfer gate signals and mainly extend in a transverse direction. Each gate line 121 includes a first gate electrode 124a and a second gate electrode 124b protruding upward and downward, and each step-down gate line 123 includes a third gate electrode 124c protruding upward. The first gate electrode 124a and the second gate electrode 124b are connected to each other, thereby forming one protrusion.

The storage electrode lines 125 are extended mainly in the transverse direction, and transfer a predetermined voltage such as a common voltage Vcom. Each storage electrode line 125 includes a storage electrode (not shown) overlapping a capacitive electrode 126 and a pixel electrode 191.

A gate insulating layer 140 is formed on the gate conductors 121, 123, and 125.

A plurality of semiconductors 154a, 154b, and 154c, which may be made of hydrogenated amorphous silicon (a-Si), polysilicon, are formed on the gate insulating layer 140. The semiconductors 154a, 154b, and 154c include first and second semiconductors 154a and 154b extending toward the first and second gate electrodes 124a and 124b and connected to each other, and a third semiconductor 154c connected to the second semiconductor 154b. The third semiconductor 154c is extended, thereby forming a fourth semiconductor 157.

A plurality of ohmic contacts 164b and 167 are formed on the semiconductors 154a, 154b, and 154c, a first ohmic contact (not shown) is formed on the first semiconductor 154a, and the second ohmic contact 164b and a third ohmic contact (not shown) are respectively formed on the second semiconductor 154b and the third semiconductor 154c. The third ohmic contact is extended, thereby forming the fourth ohmic contact 167.

A data conductor including a plurality of data lines 171, a plurality of first drain electrodes 175a, a plurality of second drain electrodes 175b, and a plurality of third drain electrode 175c is formed on the ohmic contacts 164b and 167.

The data lines 171 transmit data signals and extend in the longitudinal direction thereby intersecting the gate lines 121 and the step-down gate lines 123. Each data line 171 includes a first source electrode 173a and a second source electrode 173b extending toward a first gate electrode 124a and a second gate electrode 124b.

The first drain electrode 175a, the second drain electrode 175b, and the third drain electrode 175c have one end portion having a wide area and the other end portion of a linear shape. The bar end portions of the first drain electrode 175a and the second drain electrode 175b are partially enclosed by the first source electrode 173a and the second source electrode 173b. The wide end portion of the second drain electrode 175b is again extended, thereby forming a third source electrode 173c. An expansion 177c of the third drain electrode 175c overlaps the storage expansion 126 thereby forming a step-down capacitor Cstd, and the bar end portion is partially enclosed by the third source electrode 173c.

The first/second/third gate electrode 124a/124b/124c, the first/second/third source electrode 173a/173b/173c, and the first/second/third drain electrode 175a/175b/175c form a first/second/third thin film transistor (TFT) Qh/Ql/Qc along with the first/second/third semiconductor 154a/154b/154c, and a channel of the thin film transistor is respectively formed in the semiconductor 154a/154b/154c between the source electrode 173a/173b/173c and the drain electrode 175a/175b/175c.

The semiconductors 154a, 154b, and 154c, except for the channel region between the source electrodes 173a, 173b, and 173c and the drain electrodes 175a, 175b, and 175c, have substantially the same shape as the data conductors 171, 175a, 175b, and 175c and the underlying ohmic contacts 164b and 167. That is, the semiconductors 154a, 154b, and 154c have a portion that is exposed without being covered by the data conductors 171, 175a, 175b, and 175c, and a portion between the source electrodes 173a, 173b, and 173c and the drain electrodes 175a, 175b, and 175c.

A lower passivation layer 180p made of an inorganic insulator, such as silicon nitride or silicon oxide, is formed on the data conductors 171, 173a, 173b, 173c, 175a, 175b, and 175c and the exposed semiconductors 154a, 154b, and 154c.

A color filter 230 is formed on the lower passivation layer 180p. The color filter 230 is formed in most of the region except for where the first thin film transistor (Qh), the second thin film transistor (Ql), and the third thin film transistor (Qc) are positioned.

A light blocking member (not shown) is formed on a region that the color filter 230 does not occupy and a portion of the color filter 230. The light blocking member is referred to as a black matrix, and prevents light leakage.

An upper passivation layer 180q is formed on the color filter 230 and the light blocking member. The upper passivation layer 180q prevents peeling of the color filter 230 and the light blocking member 220, and suppresses contamination of the liquid crystal layer 3 by an organic material of the solvent that inflows from the color filter 230, so that it prevents defects such as afterimages that may occur when an image is driven.

The lower passivation layer 180p, the light blocking member, and the upper passivation layer 180q have the first contact hole 185a and the second contact hole 185b respectively exposing the wide ends of the first drain electrode 175a and the second drain electrode 175b.

A plurality of pixel electrodes 191 are formed on the upper passivation layer 180q. Each pixel electrode 191 includes a first sub-pixel electrode 191a and a second sub-pixel electrode 191b that are separated from each other with two gate lines 121 and 123 therebetween, and are disposed above and below the pixel area with the center of the gate lines 121 and 123 so as to be adjacent in a column direction. That is, one pixel area includes a first subpixel area occupied by the first subpixel electrode 191a and a second subpixel area occupied with by second subpixel electrode 191b.

The shape of the first subpixel electrode 191a and the shape of the second subpixel electrode 191b are similar to that of the liquid crystal display according to the exemplary embodiment described with reference to FIG. 2 to FIG. 5.

Next, the upper panel 200 will be described.

The liquid crystal display according to another exemplary embodiment of the present invention may include the light blocking member and the color filter formed on the insulation substrate 210.

Alignment layers (not shown) may be formed on inner surfaces of the display panels 100 and 200, and they may be vertical alignment layers.

A polarizer (not shown) may be provided on the outer surface of the two display panels 100 and 200, and transmissive axes of the two polarizers may be orthogonal to each other and any one transmissive axis of them is parallel to the gate line 121. However, the polarizer may only be disposed at one outer surface of the two display panels 100 and 200.

The liquid crystal layer 3 has negative dielectric anisotropy, and the liquid crystal molecules of the liquid crystal layer 3 may be aligned so that long axes thereof are vertical with respect to the surface of the two display panels 100 and 200 in a state in which there is no electric field. Therefore, the incident light may not pass through the crossed polarizers but is blocked in a state in which there is no electric field.

At least one of the liquid crystal layer 3 and the alignment layer may include a photoreactive material, which may be a reactive mesogen.

Next, a shape of the pixel electrode of the liquid crystal display according to the present exemplary embodiment will be described with reference to FIG. 20 as well as FIG. 18.

The first subpixel electrode 191a of the liquid crystal display according to the present exemplary embodiment is similar to the basic electrode 199 shown in FIG. 4. The first subpixel electrode 191a includes the cross-shaped stem including the first transverse stem 192a and the first longitudinal stem 193a, and a plurality of the first minute branches 194a extending therefrom. The first width W1 of the first transverse stem 192a of the first subpixel electrode 191a is greater than the second width W2 of the first longitudinal stem 193a. The first width W1 of the first transverse stem 192a of the first subpixel electrode 191a may be greater than the second width W2 of the first longitudinal stem 193a by about 1 μm to about 3 μm. In contrast, the widths of the second transverse stem 192b and the second longitudinal stem 193b of the second subpixel electrode 191b are substantially the same. That is, the width of the first transverse stem 192a of the first subpixel electrode 191a is greater than the width of the second transverse stem 192b and the second longitudinal stem 193b of the second subpixel electrode 191b and the width of the first longitudinal stem 193a of the first subpixel electrode 191a.

The first transverse stem 192a of the first subpixel electrode 191a of the liquid crystal display according to the present exemplary embodiment may be partially disconnected. Accordingly, a portion of a plurality of cutouts defining the third minute branches 194aa of the first subregion Da and the portion of a plurality of cutouts defining the fifth minute branches 194cc of the third subregion Dc may be connected to each other. Similarly, the portion of a plurality of cutouts defining the fourth minute branches 194bb of the second subregion Db and the first cutout 92a among a plurality of cutouts defining the sixth minute branches 194dd of the fourth subregion Dd may be connected to each other. The first cutout 92a extends in a direction parallel to the first minute branch 194a from a portion adjacent to the edge parallel to the data line 171 among an outer edge of the first subpixel electrode 191a, passes the first stem 192a of the first subpixel electrode 191a, and bends about 90 degrees, and then again extends to a portion adjacent to the edge parallel to the data line 171. That is, the first cutout 92a among a plurality of cutouts defining the first minute branch 194a of the first subpixel electrode 191a is also formed in the first stem 192a of the first subpixel electrode 191a.

In the first subpixel electrode 191a of the liquid crystal display according to the present exemplary embodiment, the width of the first transverse stem 192a in the cross-shaped stem is greater than the width of the first longitudinal stem 193a, and the first transverse stem 192a has the first cutout 92a extending in parallel to the first minute branch 194a such that the brightness of the region corresponding to the first subpixel electrode 191a may be reduced. Accordingly, in the low gray scale region, the brightness of the entire pixel may be reduced. Therefore, the luminance of the liquid crystal display may be decreased in the low gray scale region, and thereby the correct gray scale expression is possible in the low gray scale region.

The number of liquid crystal molecules 31 slanted in the direction parallel to the first transverse stem 192a of the first subpixel electrode 191a is greater than the number of liquid crystal molecules 31 slanted in the direction parallel to the first longitudinal stem 193a such that the luminance of the region occupied by the first subpixel electrode 191a is reduced simultaneously, and when viewing the liquid crystal display from the left side and the right side, the short axis of the liquid crystal molecules 31 is reorganized more than the long axis such that deterioration in the display quality, such as a stripe, may be prevented compared to a case in which the long axis of the liquid crystal molecule 31 is reorganized more than the short axis.

Many features of the liquid crystal display according to the exemplary embodiment described with reference to FIG. 2 to FIG. 5 may be applied to the liquid crystal display according to the current exemplary embodiment.

Figure 21:
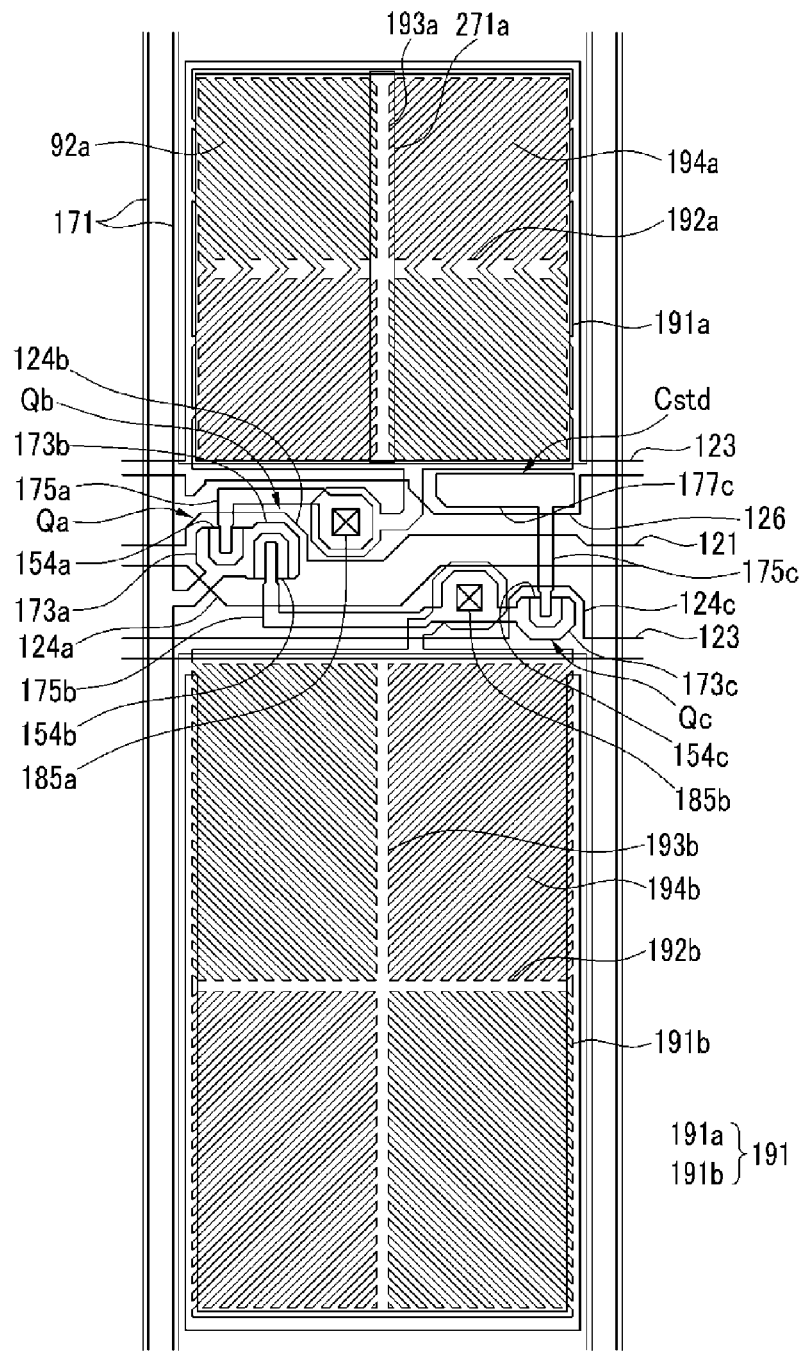
FIG. 21 is a layout view of the liquid crystal display according to another exemplary embodiment of the present invention.

Next, a liquid crystal display according to another exemplary embodiment of the present invention will be described with reference to FIG. 21 and FIG. 22. FIG. 21 is a layout view of the liquid crystal display according to another exemplary embodiment of the present invention, and FIG. 22 is a top plan view of one base region of a pixel electrode shown in the liquid crystal display of FIG. 21.

Figure 22:
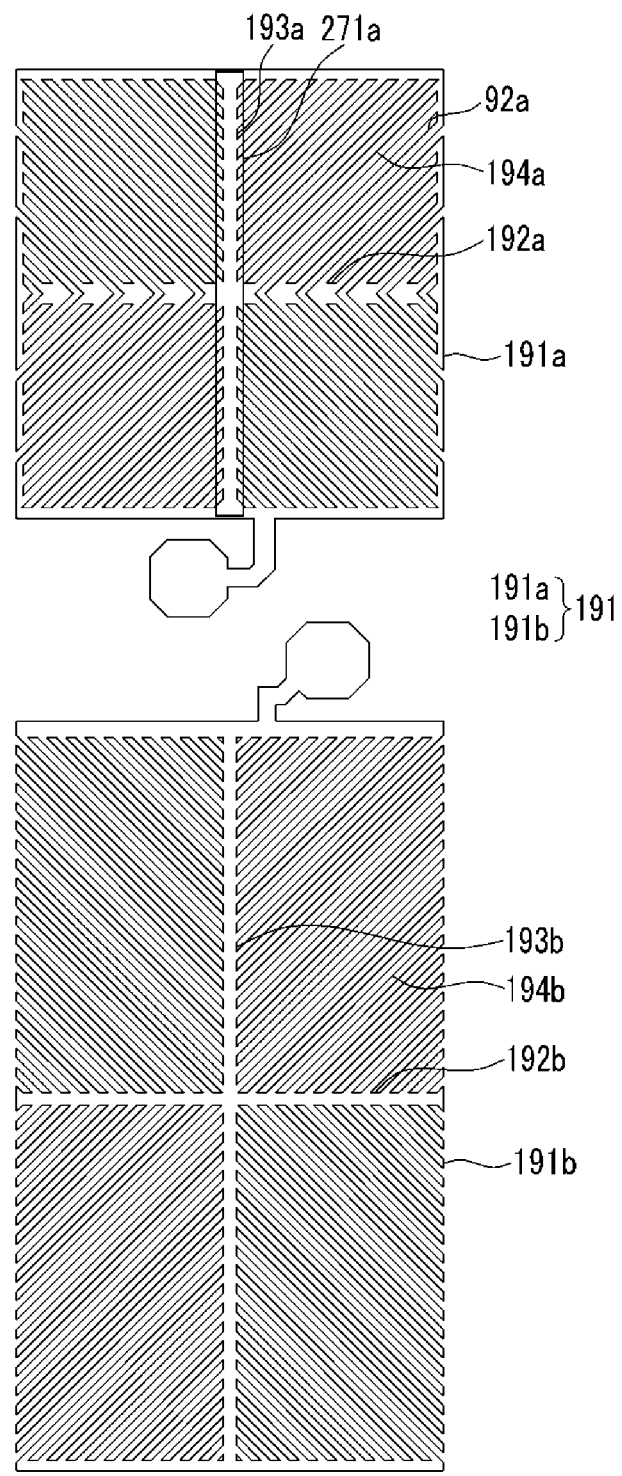
FIG. 22 is a top plan view of one base region of a pixel electrode shown in the liquid crystal display of FIG. 21.

Referring to FIG. 21 and FIG. 22, the liquid crystal display according to the present exemplary embodiment is similar to the liquid crystal display according to the exemplary embodiment of FIG. 17 to FIG. 20. The description of the same constituent elements is omitted.

In the liquid crystal display according to the present exemplary embodiment, as opposed to the liquid crystal display according to the exemplary embodiment shown in FIG. 17 to FIG. 20, the common electrode 270 has the second cutout 271a formed at the position corresponding to the first longitudinal stem 193a of the first subpixel electrode 191a. The width of the second cutout 271a may be in a range of about 2 μm to about 8 μm.

According to the liquid crystal display according to another exemplary embodiment of the present invention, the common electrode 270 may further include an additional cutout (not shown) formed at the position corresponding to the second longitudinal stem 193b of the second subpixel electrode 191b. According to the liquid crystal display according to another exemplary embodiment of the present invention, the common electrode 270 may further include an additional cutout (not shown) formed at the position corresponding to the second transverse stem 192b of the second subpixel electrode 191b.

In this way, in liquid crystal display of the present exemplary embodiment, the width of the first transverse stem 192a of the first subpixel electrode 191a is greater than the width of the first longitudinal stem 193a, the first transverse stem 192a has the first cutout 92a parallel to the first minute branch 194a, and the common electrode 270 of the upper panel 200 has the second cutout 271a formed at the position corresponding to the first longitudinal stem 193a of the first subpixel electrode 191a. Accordingly, the transmittance of the light of the first longitudinal stem 193a of the first subpixel electrode 191a is higher than the transmittance of the light of the first transverse stem 192a of the first subpixel electrode 191a. That is, similar to the liquid crystal display according to the exemplary embodiment shown in FIG. 17 to FIG. 20, by reducing the transmittance of the first transverse stem 192a of the first subpixel electrode 191a, the entire luminance of the liquid crystal display is reduced in the low gray scale region such that the correct gray scale expression is possible in the low gray scale region, and the lateral visibility may be close to the front visibility.

Many features of the liquid crystal display according to the exemplary embodiment described with reference to FIG. 17 to FIG. 20 may be applied to the liquid crystal display according to the current exemplary embodiment.

Figure 23:
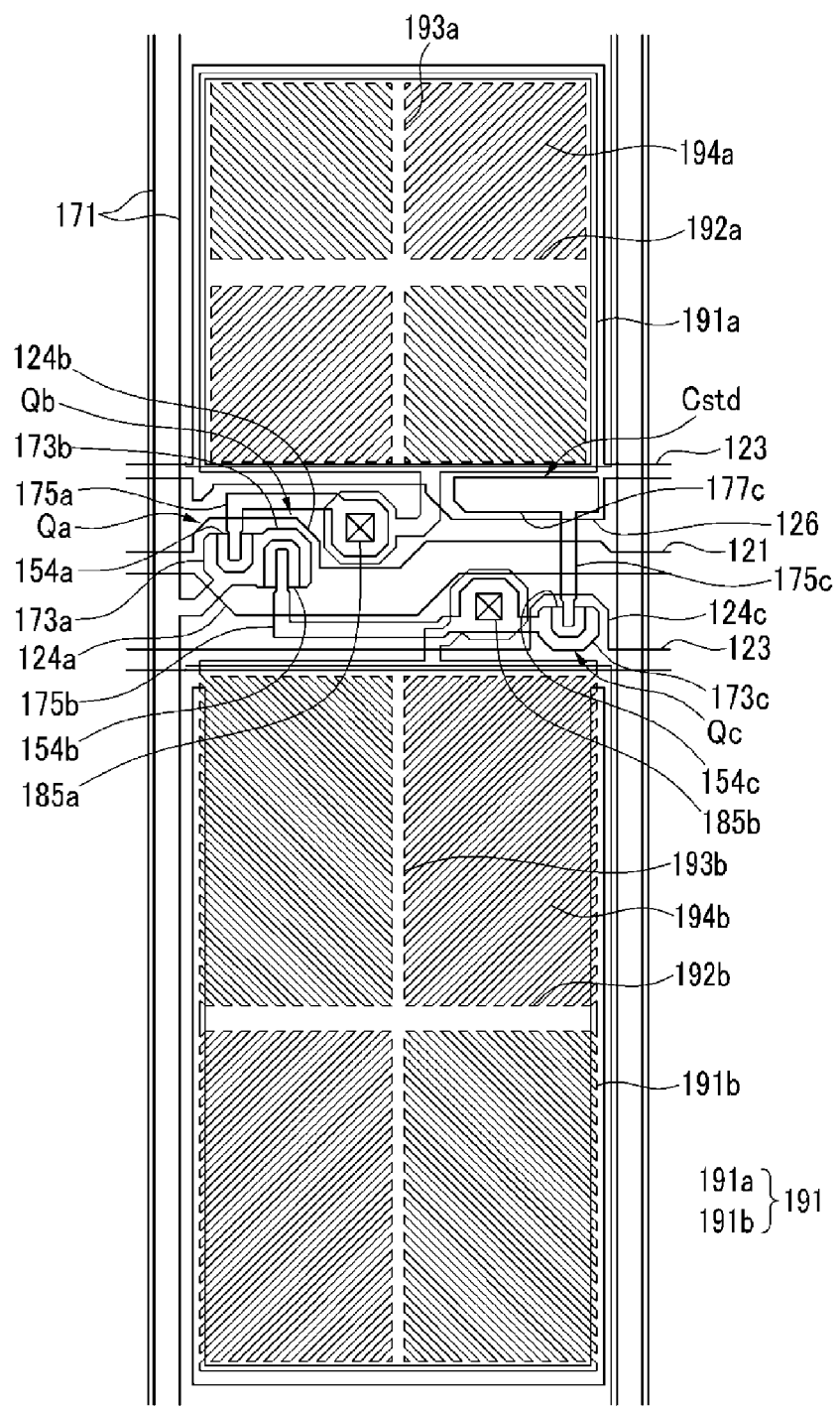
FIG. 23 is a layout view of the liquid crystal display according to another exemplary embodiment of the present invention.

Next, a liquid crystal display according to another exemplary embodiment of the present invention will be described with reference to FIG. 23 and FIG. 24. FIG. 23 is a layout view of the liquid crystal display according to another exemplary embodiment of the present invention, and FIG. 24 is a top plan view of one base region of a pixel electrode shown in the liquid crystal display of FIG. 23.

Figure 24:
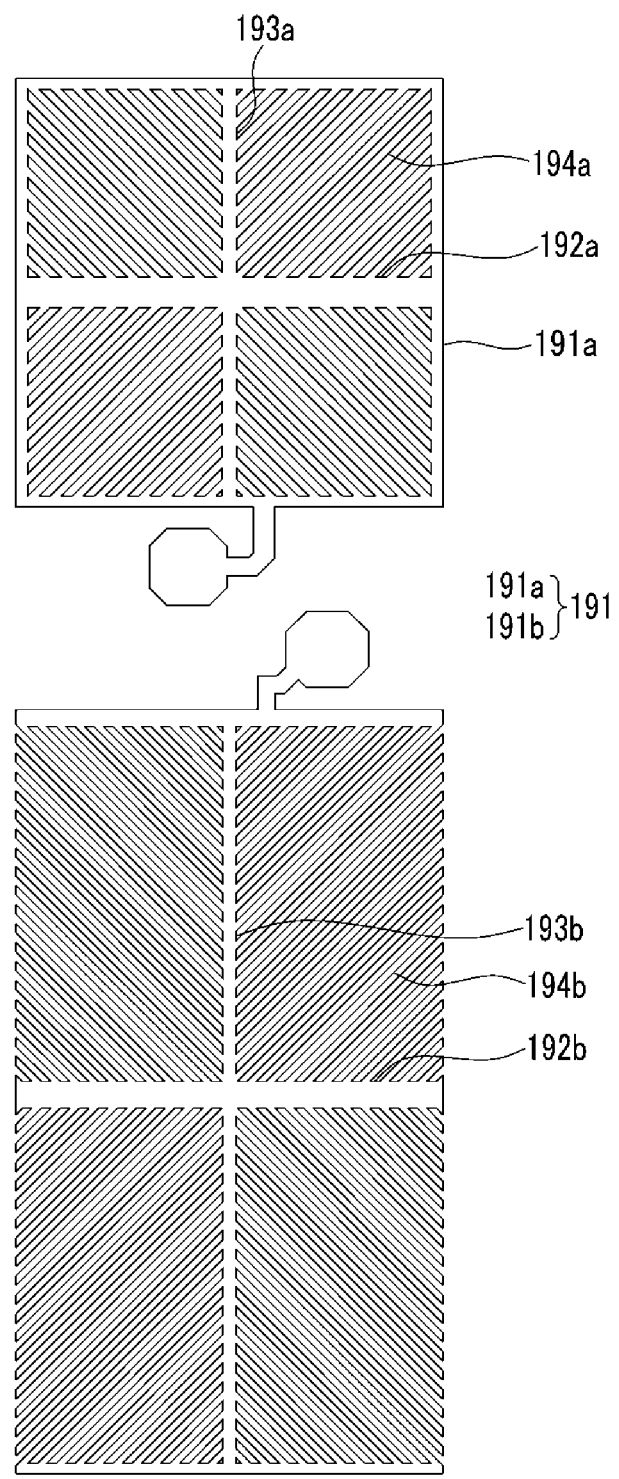
FIG. 24 is a top plan view of one base region of a pixel electrode shown in the liquid crystal display of FIG. 23.

Referring to FIG. 23 and FIG. 24, the liquid crystal display according to the present exemplary embodiment is similar to the liquid crystal display according to the exemplary embodiment of FIG. 17 to FIG. 20. The description of the same constituent elements is omitted.

In the liquid crystal display according to the present exemplary embodiment, as opposed to the liquid crystal display shown in FIG. 17 to FIG. 20, the width of the second transverse stem 192b of the second subpixel electrode 191b is greater than the width of the second longitudinal stem 193b of the second subpixel electrode 191b. The width of the first transverse stem 192a of the first subpixel electrode 191a may be greater than the width of the first longitudinal stem 193a by about 1 μm to about 3 μm, and the width of the second transverse stem 192b of the second subpixel electrode 191b may be greater than the width of the second longitudinal stem 193b by about 1 μm to about 3 μm. The first transverse stem 192a of the first subpixel electrode 191a may not include the first cutout 92a. That is, the first transverse stem 192a of the first subpixel electrode 191a may be continuously formed.

Accordingly, the first subpixel electrode 191a of the liquid crystal display according to the present exemplary embodiment may include the cross-shaped stem including the first transverse stem 192a and the first longitudinal stem 193a, and a plurality of the first minute branches 194a extending therefrom, and the second subpixel electrode 191b may include the cross-shaped stem including the second transverse stem 192b and the second longitudinal stem 193b, and a plurality of the second minute branches 194b extending therefrom.

The width of the first transverse stem 192a of the first subpixel electrode 191a is greater than the width of the first longitudinal stem 193a, and the width of the second transverse stem 192b of the second subpixel electrode 191b is greater than the width of the second longitudinal stem 193b.

In the cross-shaped stems of the first subpixel electrode 191a of the liquid crystal display according to the present exemplary embodiment, the width of the first transverse stem 192a is greater than the width of the first longitudinal stem 193a such that the brightness of the region corresponding to the first subpixel electrode 191a may be reduced. Accordingly, in the low gray scale region, the brightness of the entire pixel may be reduced. Therefore, the luminance of the liquid crystal display may be reduced in the low gray region such that the correct gray expression is possible in the low gray region. In the cross-shaped stem of the second subpixel electrode 191b, the width of the second transverse stem 192b is greater than the second longitudinal stem 193b to reduce the luminance of the liquid crystal display in the high gray region such that the deterioration of the display quality generated according to the increasing of the luminance in the high gray scale region may be prevented.

In the liquid crystal display according to an exemplary embodiment of the present invention, the pixel electrode disposed in one pixel area is divided into the first subpixel electrode 191a and the second subpixel electrode 191b, the first subpixel electrode 191a and the second subpixel electrode 191b may include the cross-shaped stem and a plurality of minute branches extended therefrom, the width of the first transverse stem 192a of the first subpixel electrode 191a is greater than the width of the first longitudinal stem 193a of the first subpixel electrode 191a, and the width of the second transverse stem 192b of the second subpixel electrode 191b is greater than the width of the second longitudinal stem 193b of the second subpixel electrode 191b such that the luminance of the liquid crystal display may be reduced in the low gray scale region and the high gray scale region, and as a result, the correct gray scale expression is possible in the low gray scale region and the high gray scale region, and the lateral visibility may be closer to the front visibility. When viewing the liquid crystal display from the side, the short axis of the liquid crystal molecules 31 may be reorganized more than the long axis, thereby preventing deterioration in the quality, such as the stripe shape, which may be generated in the case of the reorganization of the long axis of the liquid crystal molecules 31.

Many features of the liquid crystal display according to the exemplary embodiment described with reference to FIG. 2 to FIG. 5, and the liquid crystal display according to the exemplary embodiment described with reference to FIG. 17 to FIG. 20 may be applied to the liquid crystal display according to the current exemplary embodiment.

Figure 25:
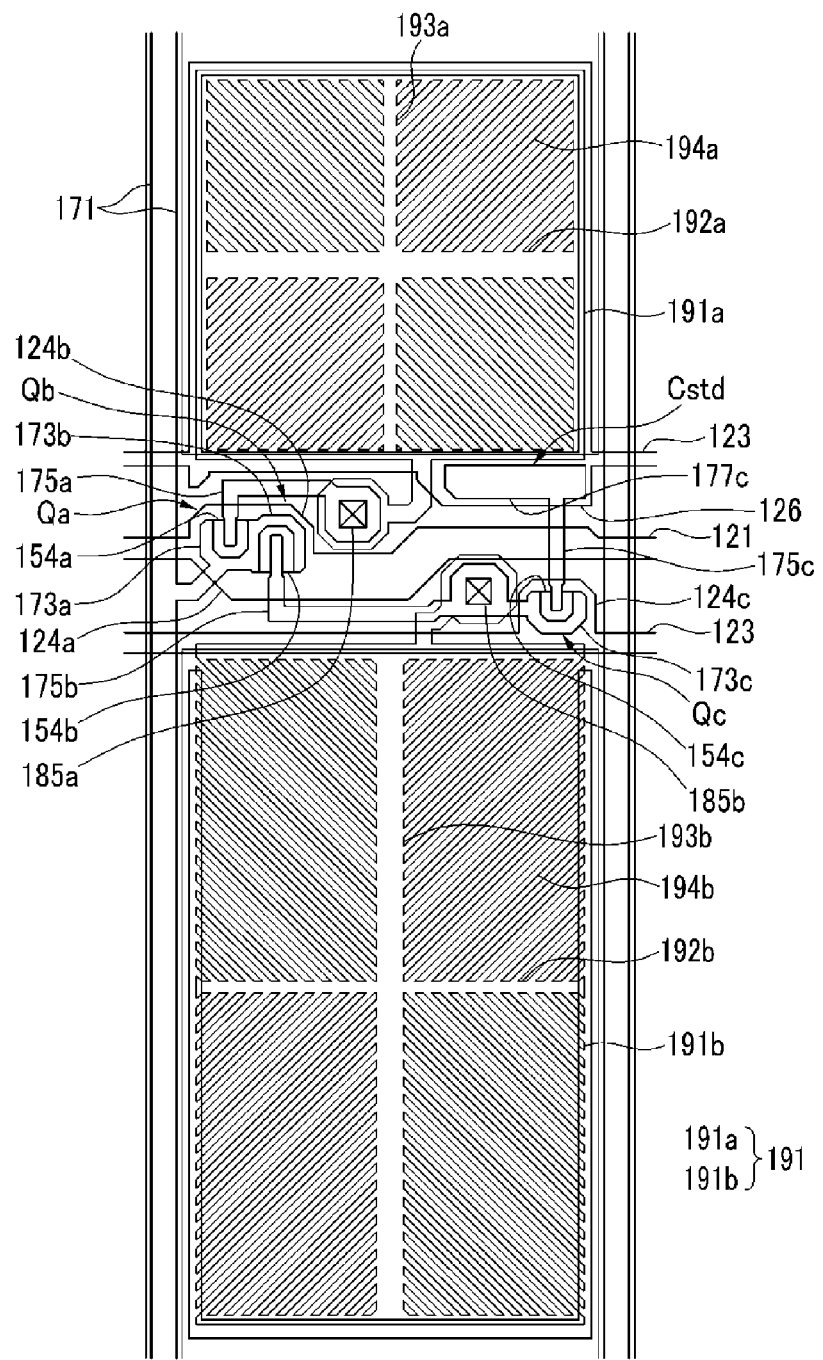
FIG. 25 is a layout view of the liquid crystal display according to another exemplary embodiment of the present invention.

Next, a liquid crystal display according to another exemplary embodiment of the present invention will be described with reference to FIG. 25 and FIG. 26. FIG. 25 is a layout view of the liquid crystal display according to another exemplary embodiment of the present invention, and FIG. 26 is a top plan view of one base region of a field generating electrode shown in the liquid crystal display of FIG. 25.

Figure 26:
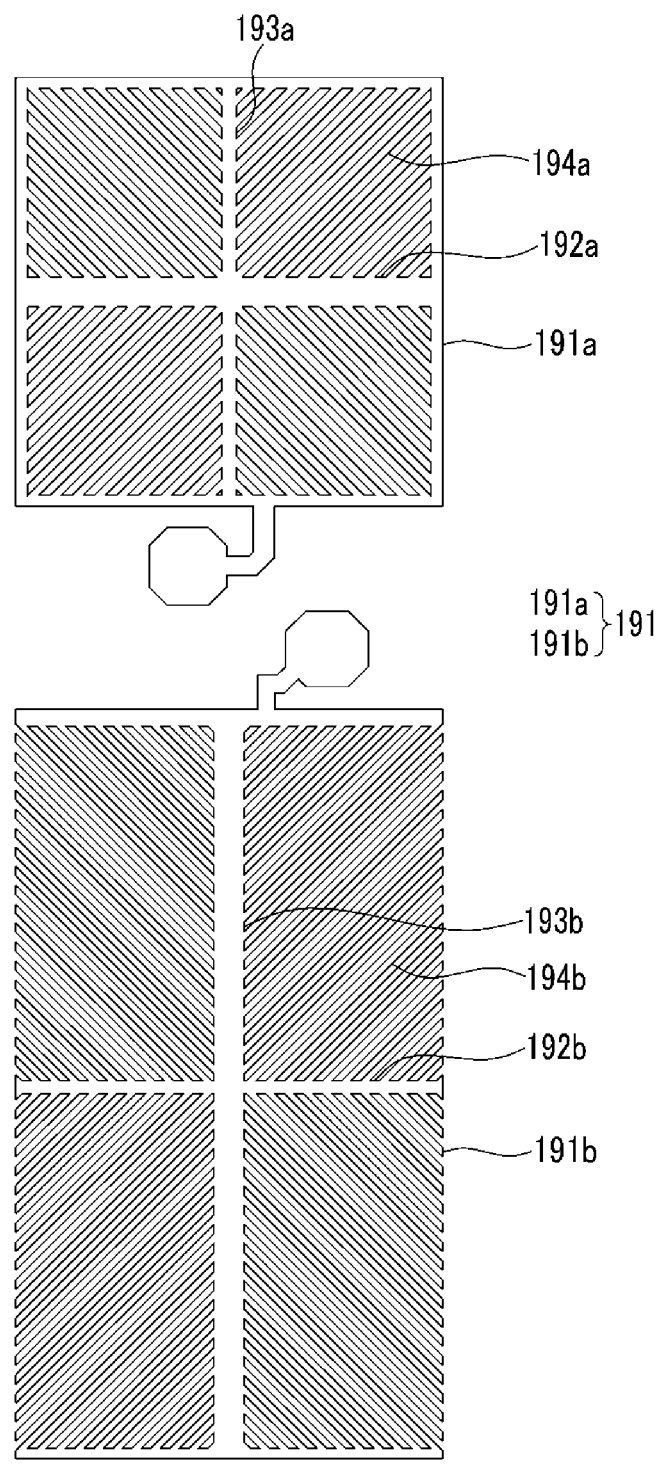
FIG. 26 is a top plan view of one base region of a pixel electrode shown in the liquid crystal display of FIG. 25.

Referring to FIG. 25 and FIG. 26, the liquid crystal display according to the present exemplary embodiment is similar to the liquid crystal display according to the exemplary embodiment of FIG. 17 to FIG. 20, and the liquid crystal display according to the exemplary embodiment of FIG. 23 and FIG. 24. The description of the same constituent elements is omitted.

However, in the liquid crystal display according to the present exemplary embodiment, differently from the liquid crystal display shown in FIG. 2 to FIG. 5 and the liquid crystal display shown in FIG. 17 to FIG. 20, the width of the second longitudinal stem 193b of the second subpixel electrode 191b is greater than the width of the second transverse stem 192b of the second subpixel electrode 191b. As opposed to the liquid crystal display according to the exemplary embodiment shown in FIG. 17 to FIG. 20, the first cutout 92a is not formed in the first transverse stem 192a of the first subpixel electrode 191a. That is, the first transverse stem 192a of the first subpixel electrode 191a may be continuously formed.

Accordingly, the first subpixel electrode 191a of the liquid crystal display according to the present exemplary embodiment may include the cross-shaped stem having the first transverse stem 192a and the first longitudinal stem 193a, and a plurality of the first minute branches 194a extending therefrom, and the second subpixel electrode 191b may include the cross-shaped stem of the second transverse stem 192b and the second longitudinal stem 193b, and a plurality of the second minute branches 194b extending therefrom.

The width of the first transverse stem 192a of the first subpixel electrode 191a is greater than the width of the first longitudinal stem 193a, and the width of the second longitudinal stem 193b of the second subpixel electrode 191b is greater than the width of the second transverse stem 192b of the second subpixel electrode 191b.

In the cross-shaped stems of the first subpixel electrode 191a of the liquid crystal display according to the present exemplary embodiment, the width of the first transverse stem 192a is greater than the width of the first longitudinal stem 193a such that the brightness of the region corresponding to the first subpixel electrode 191a may be reduced. Accordingly, in the low gray scale region, the brightness of the entire pixel may be reduced. Therefore, the luminance of the liquid crystal display may be reduced in the low gray scale region such that the correct gray scale expression is possible in the low gray scale region. The width of the second longitudinal stem 193b is greater than the width of the second transverse stem 192b of the second subpixel electrode 191b to reduce the luminance of the liquid crystal display in the high gray scale region such that the deterioration of the display quality generated according to the increasing of the luminance in the high gray scale region may be prevented.

Many features of the liquid crystal display according to the exemplary embodiment described with reference to FIG. 2 to FIG. 5 and the liquid crystal display according to the exemplary embodiment described with reference to FIG. 17 to FIG. 20 may be applied to the liquid crystal display according to the current exemplary embodiment.

Figure 27:
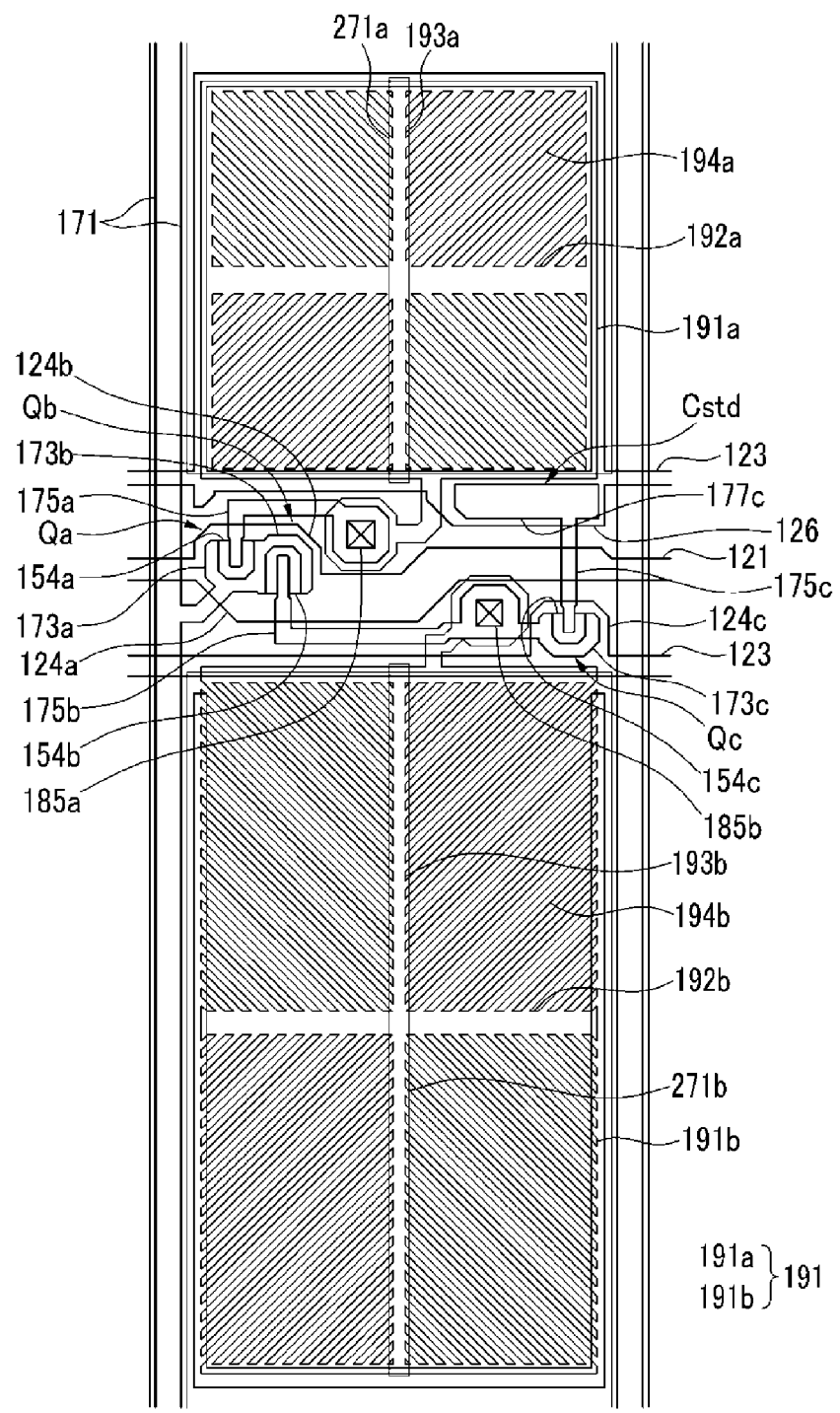
FIG. 27 is a layout view of the liquid crystal display according to another exemplary embodiment of the present invention.

Next, a liquid crystal display according to another exemplary embodiment of the present invention will be described with reference to FIG. 27 and FIG. 28. FIG. 27 is a layout view of the liquid crystal display according to another exemplary embodiment of the present invention, and FIG. 28 is a top plan view of one base region of a field generating electrode shown in the liquid crystal display of FIG. 27.

Figure 28:
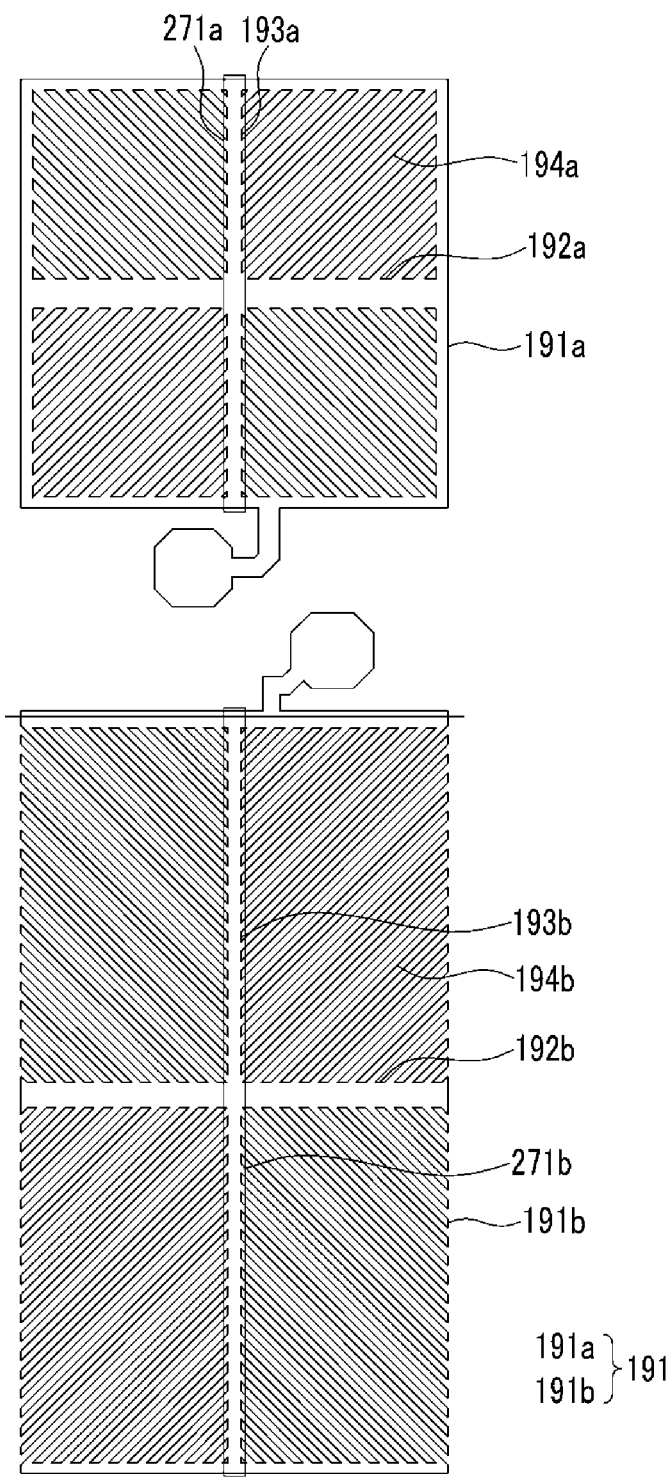
FIG. 28 is a top plan view of one base region of a pixel electrode shown in the liquid crystal display of FIG. 27.

Referring to FIG. 27 and FIG. 28, the liquid crystal display according to the present exemplary embodiment is similar to the liquid crystal display according to the exemplary embodiment shown in FIG. 17 to FIG. 20 and the liquid crystal display according to the exemplary embodiment shown in FIG. 21 and FIG. 22. The description of the same constituent elements is omitted.

However, in the liquid crystal display according to the present exemplary embodiment, as opposed to the liquid crystal displays according to the described exemplary embodiments, the width of the first transverse stem 192a of the first subpixel electrode 191a is not only greater than the width of the first longitudinal stem 193a, but the width of the second transverse stem 192b of the second subpixel electrode 191b is also greater than the width of the second longitudinal stem 193b. The width of the first transverse stem 192a of the first subpixel electrode 191a may be greater than the width of the first longitudinal stem 193a by about 1 μm to about 3 μm, and the width of the second transverse stem 192b of the second subpixel electrode 191b may be greater than the width of the second longitudinal stem 193b by about 1 μm to about 3 μm. The common electrode 270 of the upper panel 200 may have the second cutout 271a formed at the position corresponding to the first longitudinal stem 193a of the first subpixel electrode 191a and the third cutout 271b formed at the position corresponding to the second longitudinal stem 193b of the second subpixel electrode 191b. The width of the second cutout 271a and the third cutout 271b may be in a range of about 2 μm to about 8 μm. However, according to the liquid crystal display according to another exemplary embodiment of the present invention, the third cutout 271b of the common electrode 270 may be omitted. According to the liquid crystal display according to another exemplary embodiment of the present invention, the third cutout 271b of the common electrode 270 is not formed at the position corresponding to the second longitudinal stem 193b of the second subpixel electrode 191b, and may be formed at the position corresponding to the second transverse stem 192b of the second subpixel electrode 191b.

In this way, in the case of the liquid crystal display according to the present exemplary embodiment, the width of the first transverse stem 192a of the first subpixel electrode 191a is greater than the width of the first longitudinal stem 193a, and the common electrode 270 of the upper panel 200 has the second cutout 271a formed at the position corresponding to the first longitudinal stem 193a of the first subpixel electrode 191a. Accordingly, the transmittance of the light of the first longitudinal stem 193a of the first subpixel electrode 191a is higher than the transmittance of the light of the first transverse stem 192a of the first subpixel electrode 191a. That is, similar to the liquid crystal display according to the exemplary embodiment shown in FIG. 2 to FIG. 5, by reducing the transmittance of the first transverse stem 192a of the first subpixel electrode 191a, the entire luminance of the liquid crystal display may be reduced in the low gray scale region such that the correct gray scale expression is possible in the low gray scale region, and the lateral visibility may be close to the front visibility.

In the case of the liquid crystal display according to the present exemplary embodiment, the width of the second transverse stem 192b of the second subpixel electrode 191b is greater than the width of the second longitudinal stem 193b, and the common electrode 270 has the third cutout 271b formed at the position corresponding to the second longitudinal stem 193b of the second subpixel electrode 191b. Accordingly, the transmittance of the light for the second transverse stem 192b of the second subpixel electrode 191b is higher than the transmittance of the light for the second longitudinal stem 193b of the second subpixel electrode 191b. However, as described above, according to the liquid crystal display according to another exemplary embodiment of the present invention, the third cutout 271b of the common electrode 270 may be omitted. According to the liquid crystal display according to another exemplary embodiment of the present invention, the third cutout 271b of the common electrode 270 is not formed at the position corresponding to the second longitudinal stem 193b of the second subpixel electrode 191*b* and may be formed at the position corresponding to the second transverse stem 192*b* of the second subpixel electrode 191*b*. Therefore, the luminance of the liquid crystal display may be reduced in the high gray scale region such that the deterioration of the display quality generated according to the increasing of the luminance may be prevented in the high gray scale region.

As described above, according to the liquid crystal display according to another exemplary embodiment of the present invention, the third cutout 271*b* of the common electrode 270 may be omitted. According to the liquid crystal display according to another exemplary embodiment of the present invention, the third cutout 271*b* of the common electrode 270 is not formed at the position corresponding to the second longitudinal stem 193*b* of the second subpixel electrode 191*b*, and may be formed at the position corresponding to the second transverse stem 192*b* of the second subpixel electrode 191*b*.

Many features of the liquid crystal display according to the present exemplary embodiment are similar to those of the liquid crystal display according to the exemplary embodiment of FIG. 2 to FIG. 5, the liquid crystal display according to the exemplary embodiment of FIG. 17 to FIG. 20, and the liquid crystal display according to the exemplary embodiment of FIG. 21 and FIG. 22, so they may be applied to the liquid crystal display of the present exemplary embodiment.

The second cutout 271*a* and the third cutout 271*b* in the above exemplary embodiments may be replaced with a protrusion formed on or under the common electrode 270. That is, the common electrode 270 may not include the second cutout 271*a* and the third cutout 271*b*, and the upper panel 200 may include an insulating protrusion formed at the position corresponding to the second cutout 271*a* and the third cutout 271*b* on or under the common electrode 270.

It will be apparent to those skilled in the art that various modifications and variations can be made in the present invention without departing from the spirit or scope of the invention. Thus, it is intended that the present invention cover various modifications and variations of this invention provided they come within the spirit and scope of the appended claims and their equivalents.

What is claimed is:

1. A liquid crystal display, comprising:
a first substrate;
a pixel electrode disposed on the first substrate and comprising a first subpixel electrode and a second subpixel electrode disposed in a pixel area;
a second substrate facing the first substrate; and
a common electrode disposed on the second substrate,
wherein an area of a region occupied by the first subpixel electrode is less than an area of a region occupied by the second subpixel electrode,
wherein the first subpixel electrode comprises a first transverse stem, a first longitudinal stem, and a plurality of first minute branches extending from the first transverse stem and the first longitudinal stem,
wherein the second subpixel electrode comprises a second transverse stem, a second longitudinal stem, and a plurality of second minute branches extending from the second transverse stem and the second longitudinal stem, and
wherein the common electrode comprises a first cutout formed at a position corresponding to the first longitudinal branch of the first subpixel electrode.

2. The liquid crystal display of claim 1, wherein:
the width of the first transverse stem of the first subpixel electrode is larger than the width of the first longitudinal stem of the first subpixel electrode.

3. The liquid crystal display of claim 2, wherein:
the common electrode further comprises a second cutout formed at a position corresponding to the second longitudinal stem or the second transverse stem of the second subpixel electrode.

4. The liquid crystal display of claim 3, wherein:
the width of the second transverse stem of the second subpixel electrode is substantially the same as the width of the second longitudinal stem of the second subpixel electrode.

5. The liquid crystal display of claim 3, further comprising:
a liquid crystal layer comprising liquid crystal molecules disposed between the first substrate and the second substrate,
wherein the liquid crystal molecules are arranged substantially perpendicular to a surface of the first substrate and the second substrate in the absence of an electric field between the pixel electrode and the common electrode.

6. The liquid crystal display of claim 5, further comprising:
an alignment layer disposed on at least one of the first substrate and the second substrate,
wherein at least one of the liquid crystal layer and the alignment layer comprises a light reactive material.

7. The liquid crystal display of claim 1, further comprising:
a liquid crystal layer comprising liquid crystal molecules disposed between the first substrate and the second substrate, and
wherein the liquid crystal molecules are arranged substantially perpendicular to a surface of the first substrate and the second substrate in the absence of an electric field between the pixel electrode and the common electrode.

8. The liquid crystal display of claim 7, further comprising:
an alignment layer disposed on at least one of the first substrate and the second substrate,
wherein at least one of the liquid crystal layer and the alignment layer comprises a light reactive material.

\* \* \* \* \*